United States Patent
Jeong et al.

(10) Patent No.: US 9,402,066 B2
(45) Date of Patent: Jul. 26, 2016

(54) METHOD AND DEVICE FOR ENCODING A DEPTH MAP OF MULTI VIEWPOINT VIDEO DATA, AND METHOD AND DEVICE FOR DECODING THE ENCODED DEPTH MAP

(75) Inventors: Seung-soo Jeong, Seoul (KR); Byeong-doo Choi, Siheung-si (KR); Jeong-Hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 14/238,037

(22) PCT Filed: Aug. 9, 2012

(86) PCT No.: PCT/KR2012/006357
§ 371 (c)(1),
(2), (4) Date: Feb. 10, 2014

(87) PCT Pub. No.: WO2013/022297
PCT Pub. Date: Feb. 14, 2013

(65) Prior Publication Data
US 2014/0192154 A1    Jul. 10, 2014

Related U.S. Application Data

(60) Provisional application No. 61/521,529, filed on Aug. 9, 2011.

(51) Int. Cl.
*H04N 15/00* (2006.01)
*H04N 13/00* (2006.01)
(Continued)

(52) U.S. Cl.
CPC ......... *H04N 13/0048* (2013.01); *H04N 19/597* (2014.11); *H04N 19/96* (2014.11); *H04N 2213/005* (2013.01)

(58) Field of Classification Search
USPC ................ 348/43, 44, 42, 47, 48, 51, 52, 59, 348/14.07, 208.99, 239, 382, 393.1, 394.1, 348/395.1, 401.1, 420.1, 421.1, 429.1, 468, 348/564, 568, 588, 608, 642, 840; 375/240.01, 240.03, 240.07, 240.08, 375/240.12, 240.13, 240.15, 240.16, 375/240.24, 240.26, 240.27
See application file for complete search history.

(56) References Cited

U.S. PATENT DOCUMENTS 8,023,562 B2    9/2011   Zheludkov et al.
8,311,353 B2    11/2012  Strom et al.
(Continued)

FOREIGN PATENT DOCUMENTS

CN          101925925 A    12/2010
KR    10-2008-0063323 A    7/2008
(Continued)

OTHER PUBLICATIONS

Communication dated Aug. 13, 2015 issued by the State Intellectual Property Office of P.R. China in counterpart Application No. 201280049632.6.
(Continued)

*Primary Examiner* — Brian P. Yenke
*Assistant Examiner* — Mustafizur Rahman
(74) *Attorney, Agent, or Firm* — Sughrue Mion, PLLC

(57) ABSTRACT

A method and apparatus for decoding the depth map of multi-view video data are provided. The method includes splitting a block of restored multi-view color video frame into a partition based on a pixel value of the block of the prediction-encoded and restored multi-view color video frame; obtaining a parameter indicating correlation between block partitions of the multi-view color video frame and block partitions of the depth map frame using peripheral pixel values of the block partitions of the multi-view color video frame and peripheral pixel values of the block partitions of the depth map frame corresponding to the block partitions of the multi-view color video frame with respect to each of the block partitions of the restored multi-view color video frame; and obtaining prediction values of corresponding block partitions of the depth map frame from the block partitions of the restored multi-view color video frame using the obtained parameter.

15 Claims, 28 Drawing Sheets

(51) Int. Cl.
*H04N 19/597* (2014.01)
*H04N 19/96* (2014.01)

(56) References Cited

U.S. PATENT DOCUMENTS

| | | | | |
|---|---|---|---|---|
| 8,532,410 | B2* | 9/2013 | Tian | H04N 19/597 382/232 |
| 2002/0136296 | A1* | 9/2002 | Stone | H04N 19/176 375/240.03 |
| 2005/0047502 | A1* | 3/2005 | McGowan | H04N 9/8042 375/240.01 |
| 2009/0129667 | A1* | 5/2009 | Ho | G06T 7/0065 382/154 |
| 2009/0185616 | A1* | 7/2009 | Pandit | H04N 19/597 375/240.01 |
| 2009/0185627 | A1* | 7/2009 | Park | H04N 19/105 375/240.26 |
| 2010/0165077 | A1* | 7/2010 | Yin | H04N 19/597 348/42 |
| 2010/0214425 | A1* | 8/2010 | Huang | H04N 5/23248 348/208.99 |
| 2010/0260486 | A1* | 10/2010 | Liu | H04N 13/0242 386/341 |
| 2010/0284466 | A1* | 11/2010 | Pandit | H04N 19/597 375/240.16 |
| 2011/0038418 | A1 | 2/2011 | Pandit et al. | |
| 2011/0069152 | A1* | 3/2011 | Wang | G06T 7/0081 348/43 |
| 2011/0069760 | A1 | 3/2011 | Lee et al. | |
| 2011/0096832 | A1* | 4/2011 | Zhang | G06T 7/0071 375/240.08 |
| 2011/0181693 | A1* | 7/2011 | Lee | H04N 19/597 348/43 |
| 2011/0261883 | A1 | 10/2011 | Bang et al. | |
| 2014/0192155 | A1* | 7/2014 | Choi | H04N 19/00769 348/43 |

FOREIGN PATENT DOCUMENTS

| | | |
|---|---|---|
| KR | 10-2010-0066304 A | 6/2010 |
| KR | 10-2011-0003549 A | 1/2011 |
| KR | 10-2011-0032048 A | 3/2011 |
| WO | 2007047736 A2 | 4/2007 |
| WO | 2007047736 A3 | 4/2007 |
| WO | 2010/151279 A1 | 12/2010 |
| WO | 2011/046607 A2 | 4/2011 |
| WO | 2011/050304 A2 | 4/2011 |

OTHER PUBLICATIONS

International Search Report (PCT/ISA/210), dated Feb. 13, 2013, issued by the International Searching Authority in counterpart International Patent Application No. PCT/KR2012/006357.
Written Opinion (PCT/ISA/237), dated Feb. 13, 2013, issued by the International Searching Authority in counterpart International Patent Application No. PCT/KR2012/006357.
Communication dated Feb. 3, 2016, issued by the Australian Intellectual Property Office in counterpart Australian Application No. 2012295044.
Communication dated Feb. 24, 2016, issued by the European Patent Office in counterpart European Application No. 12822820.2.
Thomas Davies et al., "Suggestion for a Test Model", Joint Collaborative Team on Video Coding (JCT-VC) of ITU-T SG16 WP3 and ISO/IEC JTC1/SC29/WG11, 1st Meeting: Dresden, DE, Apr. 15-23, 2010, Document: JCTVC-A033, Total 30 pages, XP 030007526.
Peng Yin et al., "Localized Weighted Prediction for Video Coding", Conference Proceedings/IEEE International Symposium on Circuits and Systems (ISCAS): May 23-26, 2005, International Conference Center, Kobe, Japan, IEEE Service Center, Piscataway, NJ, May 23, 2005, pp. 4365-4368, XP 010816640.
Jill M. Boyce; "Weighted prediction in the H.264/MPEG AVC video coding standard", Proceedings/2004 IEEE International Symposium on Circuits and Systems: May 23-26, 2004, Sheraton Vancouver Wall Centre Hotel, Vancouver, British Columbia, Canada, IEEE Operations Center, Piscataway, NJ, May 23, 2004, pp. III-789~III-792, XP 010719383.
Heiko Schwarz et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 1, 2007, pp. 1103-1120, XP 011193019.
Byeong-Doo Choi et al., "Description of HEVC compatible 3D video coding technology by Samsung—Additional proposal", ISO/IEC JTC1/SC29/WG11 Coding of Moving Pictures and Audio, 98. MPEG Meeting; Nov. 28, 2011-Dec. 2, 2011; Geneva; (Motion Picture Expert Group or ISO/IEC JTC1/SC29/WG11), No. m22634, Nov. 24, 2011, Total 12 pages, XP 030051197.

* cited by examiner

FIG. 2
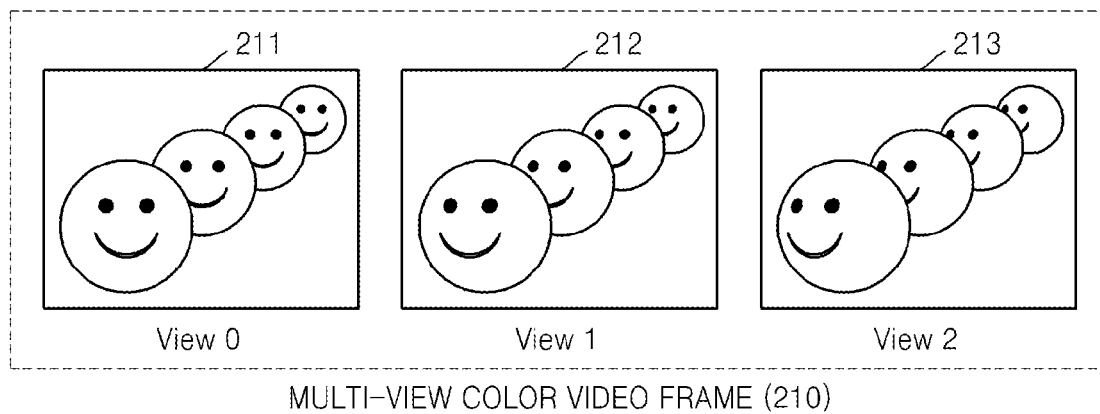
MULTI-VIEW COLOR VIDEO FRAME (210)
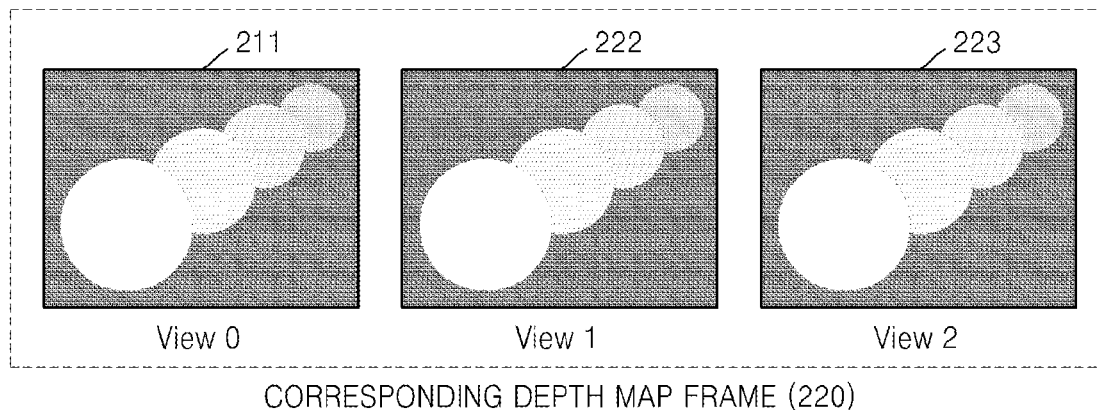
CORRESPONDING DEPTH MAP FRAME (220)

FIG. 19
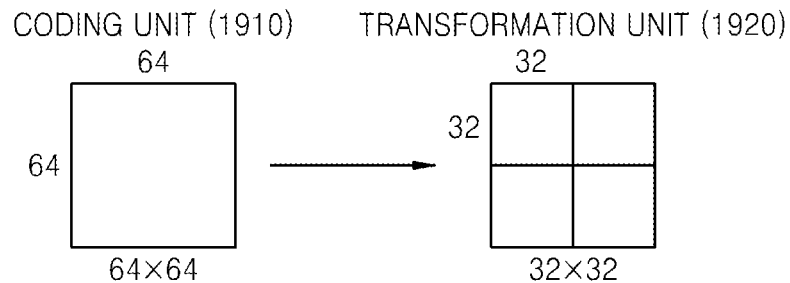
FIG. 20
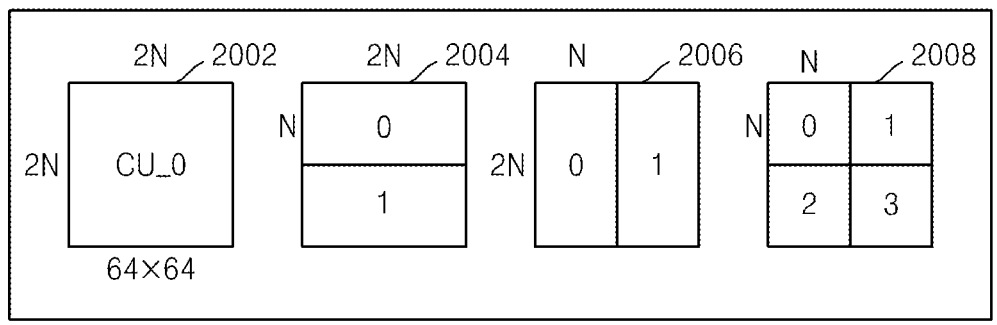
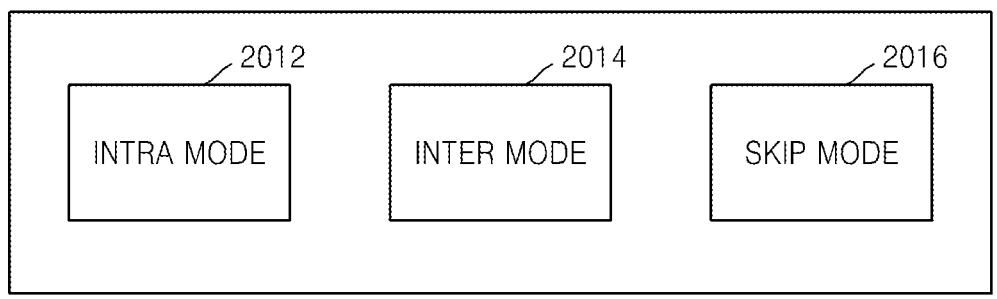
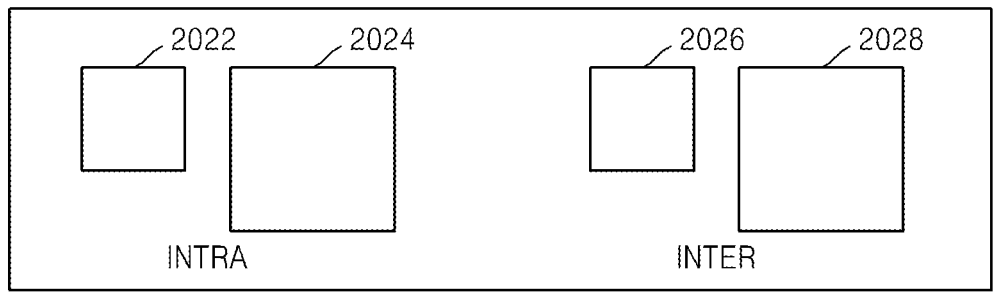

CODING UNIT (2210)

METHOD AND DEVICE FOR ENCODING A DEPTH MAP OF MULTI VIEWPOINT VIDEO DATA, AND METHOD AND DEVICE FOR DECODING THE ENCODED DEPTH MAP

CROSS-REFERENCE TO RELATED APPLICATION

This application is a National Stage Application under 35 U.S.C. §371 of International Application No. PCT/KR2012/006357, filed on Aug. 9, 2012, and claims the benefit of U.S. Provisional Application No. 61/521,529, filed on Aug. 9, 2011, in the U.S. Patent and Trademark Office, the disclosures of which are incorporated herein by reference in their entireties.

BACKGROUND

1. Field

Exemplary embodiments relate to encoding and decoding multi-view video data including a depth image.

2. Description of Related Art

Recently, as digital image processing and computer graphics technology have been developed, research has been actively conducted on three-dimensional (3D) video technology and multi-view video technology enabling a real world to be reproduced and users to realistically experience the reproduced real world. 3D televisions (TVs) using multi-view video are capable of providing users with realistic feelings by displaying contents obtained by reproducing a real world, and thus have drawn much attention as next-generation broadcasting technology. A 3D video encoding system has a function of supporting multi-view images, via which users may freely change viewpoints or so that the 3D video encoding system can be applied to various types of 3D reproducing apparatuses. However, since an amount of data of multi-view video is high, there is a need to develop an encoding method of efficiently reducing the amount of the data of the multi-view video.

SUMMARY

Exemplary embodiments relate to a method and apparatus for efficiently encoding a depth map image for providing 3D video to multi-view video data, and a method and apparatus for effectively decoding the depth map.

According to an exemplary embodiment, the correlation between peripheral pixels of a color image and peripheral pixels of a depth image is obtained and a block of a current depth image are encoded through intra prediction using a block of a corresponding color image.

According to an aspect of an exemplary embodiment, there is provided a method of encoding a depth map of multi-view video data, the method comprising: obtaining a multi-view color video frame and a depth map frame corresponding to the multi-view color video frame; prediction-encoding and restoring the obtained multi-view color video frame; splitting a block of the restored multi-view color video frame into at least one partition based on a pixel value of the block of the restored multi-view color video frame; obtaining a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the restored multi-view color video frame; and obtaining prediction values of the corresponding block partitions of the depth map frame from the block partitions of the restored multi-view color video frame by using the obtained parameter.

According to an aspect of another exemplary embodiment, there is provided an apparatus for encoding a depth map of multi-view video data, the apparatus comprising: an image obtaining unit for obtaining a multi-view color video frame and a depth map frame corresponding to the multi-view color video frame; a color video frame encoding unit for prediction-encoding the obtained multi-view color video frame; a restoring unit for restoring the encoded color video frame; a splitting unit for splitting a block of the restored multi-view color video frame into at least one partition based on a pixel value of the block of the restored multi-view color video frame; a correlation parameter obtaining unit for obtaining a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the restored multi-view color video frame; and a depth map frame prediction unit for obtaining prediction values of the corresponding block partitions of the depth map frame from the block partitions of the restored multi-view color video frame by using the obtained parameter.

According to an aspect of another exemplary embodiment, there is provided a method of decoding a depth map of multi-view video data, the method comprising: receiving a bitstream obtained by encoding a multi-view color video frame and a depth map frame corresponding to the multi-view color video frame; decoding the multi-view color video frame; splitting a block of the decoded multi-view color video frame into at least one partition based on a pixel value of the block of the decoded multi-view color video frame; obtaining a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the decoded multi-view color video frame; and obtaining prediction values of the corresponding block partitions of the depth map frame from the block partitions of the decoded multi-view color video frame by using the obtained parameter.

According to an aspect of another exemplary embodiment, there is provided an apparatus for decoding a depth map of multi-view video data, the apparatus comprising: a receiving unit for receiving a bitstream obtained by encoding a multi-view color video frame and a depth map frame corresponding to the multi-view color video frame; a color video frame decoding unit for decoding the encoded multi-view color video frame obtained from the bitstream; a splitting unit for splitting a block of the restored multi-view color video frame into at least one partition based on a pixel value of the block of the restored multi-view color video frame; a correlation parameter obtaining unit for obtaining a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the restored multi-view color video frame; and a depth map decoding unit for obtaining prediction values of the corresponding block partitions of the depth map frame from the block partitions of the restored multi-view color video frame by using the obtained parameter.

Accordingly, multi-view video data having an enormous amount of data can be efficiently compressed by predicting a corresponding depth map frame from a multi-view color video frame. Further, a parameter indicating the correlation is determined from previously encoded peripheral pixel values, and thus it is not necessary to transmit an additional parameter.

BRIEF DESCRIPTION OF THE DRAWINGS

FIG. 2 illustrates multi-view video frames obtained via multi-view cameras of FIG. 1 and depth map frames obtained via a depth camera of FIG. 1.

FIG. 19 is a diagram illustrating a correlation between a coding unit and transformation units, according to an exemplary embodiment.

FIG. 20 is a diagram illustrating encoding information corresponding to depths, according to an exemplary embodiment.

DETAILED DESCRIPTION OF EXEMPLARY EMBODIMENTS

Hereinafter, exemplary embodiments will be described in detail with reference to the appended claims.

Figure 1:
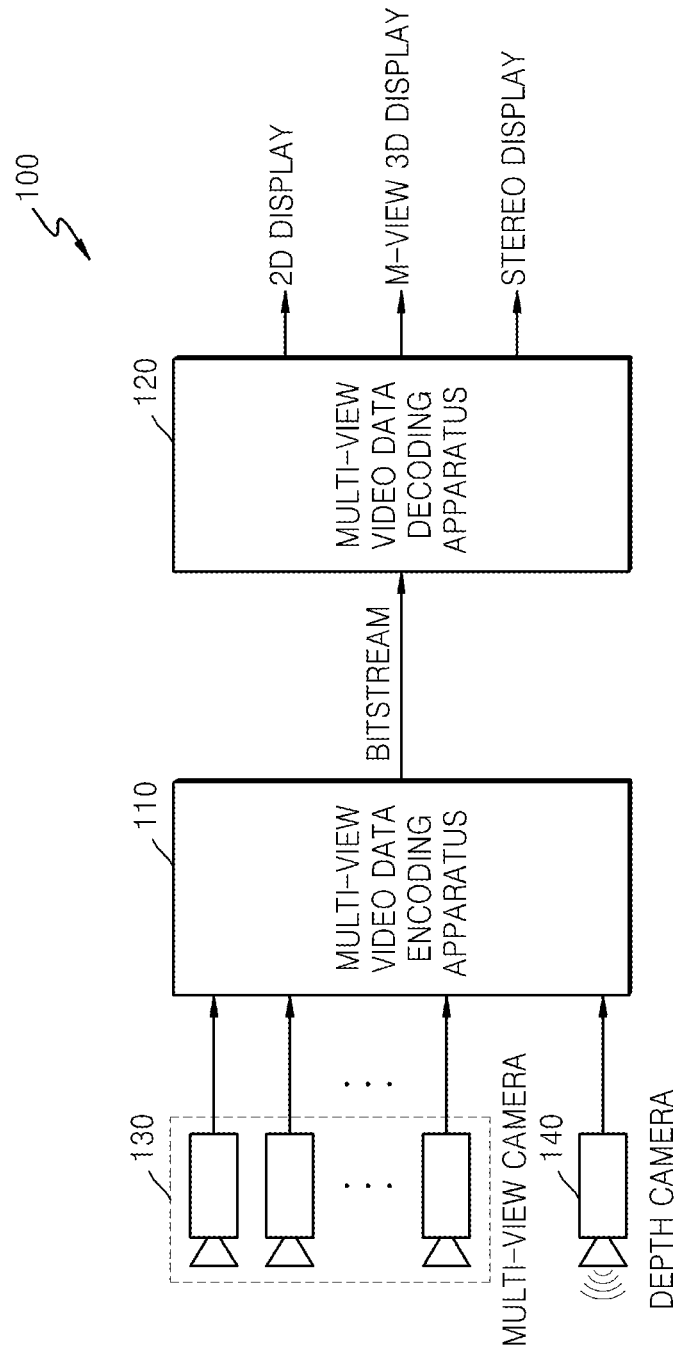
FIG. 1 is a block diagram of a multi-view video system according to an exemplary embodiment.

FIG. 1 is a block diagram of a multi-view video system 100 according to an exemplary embodiment.

The multi-view video system 100 includes a multi-view video data encoding apparatus 110 and a multi-view video data decoding apparatus 120. The multi-view video data encoding apparatus 110 generates a bitstream by encoding a multi-view video frame obtained via at least two multi-view cameras 130 and a depth map frame corresponding to the multi-view video frame, obtained via a depth camera 140. The multi-view video data decoding apparatus 120 decodes the bitstream to obtain the decoded multi-view video frame, and provides the decoded multi-view video frame in any of various formats, according to a demand of a viewer.

The at least two multi-view cameras 130 are manufactured by combining a plurality of different view cameras and may provide multi-view video in units of frames. The depth camera 140 provides a depth map frame that represents depth information of a scene with an 8-bit image having 256 gradation levels. The depth camera 140 may measure a distance between the depth camera 140 itself and an object or a background by using infrared rays, and may provide the depth map frame that is proportional or inversely proportional to the distance.

If the multi-view video data encoding apparatus 110 encodes multi-view video data and a depth map frame corresponding thereto and transmits a result of the encoding through bitstream, then the multi-view video data decoding apparatus 120 may not only provide a stereoscopic effect using the existing stereo image or three-dimensional (3D) video but also synthesize 3D video from viewpoints that a viewer desires, based on the multi-view video frame and the depth map frame included in the bitstream.

An amount of multi-view video data that is to be encoded increases to be proportional to the number of viewpoints, and a depth map image should also be encoded so as to add a stereoscopic effect to multi-view video data. Thus, to realize a multi-view video system as illustrated in FIG. 1, an enormous amount of multi-view video data should be effectively compressed.

FIG. 2 illustrates multi-view video frames obtained via the at least two multi-view cameras 130 of FIG. 1 and depth map frames obtained via the depth camera 140 of FIG. 1.

FIG. 2 illustrates a depth map frame 221 captured from a first viewpoint view 0 corresponding to a color video frame 211 captured from the first viewpoint view 0, a depth map frame 222 captured from a second viewpoint view 1 corresponding to a color video frame 212 captured from the second viewpoint view 1, and a depth map frame 223 captured from a third viewpoint view 2 corresponding to a color video frame 213 captured from the third viewpoint view 2. Although FIG. 2 illustrates a multi-view color video frame 210 and a depth map frame 220 corresponding thereto, captured from the three viewpoints view 0, view 1, and view 2, the total number of viewpoints is not limited thereto. In FIG. 2, the multi-view color video frame 210 may be a luminance component video frame or a chrominance component video frame.

Referring to FIG. 2, a specific correlation is present between a color video frame and a depth map frame thereof captured from the same viewpoint, since they are obtained by representing an image captured at the same point of time and from the same viewpoint by using a color and depth. That is, when the multi-view color video frame 210 and the corresponding depth map frame 220 are compared, a specific correlation is present therebetween, e.g., the outline of an object may be identified. Thus, the multi-view video data encoding apparatus 110 and the multi-view video data decoding apparatus 120 according to the present embodiment may prediction-encode the corresponding depth map frame 220 based on a result of encoding the multi-view color video frame 210, in consideration of the correlation between the multi-view color video frame 210 and the corresponding depth map frame 220, thereby increasing the compression efficiency of multi-view video data. In particular, the multi-view video data encoding apparatus 110 and the multi-view video data decoding apparatus 120 according to the present embodiment split a block of the multi-view color video frame 210 into partitions based on pixel values, split a block of the corresponding depth map frame 220 into partitions in the same manner as the block of the multi-view color video frame 210, obtain a parameter indicating correlations between the block partitions of the multi-view color video frame 210 and the block partitions of the corresponding depth map frame 220 by using peripheral pixel values of the block partitions of the multi-view color video frame 210 and peripheral pixel values of the block partitions of the corresponding depth map frame 220, and predict the block partitions of the corresponding depth map frame 220 from the block partitions of the multi-view color video frame 210 by using the correlations determined using the obtained parameter.

Figure 3:
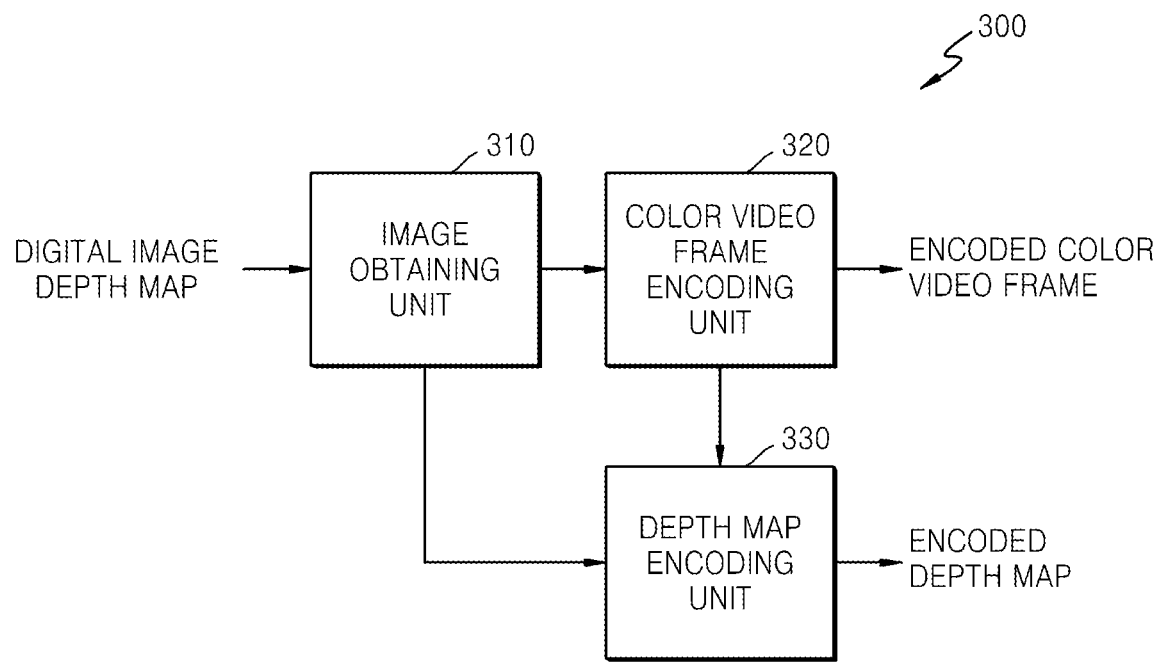
FIG. 3 is a block diagram of a multi-view video data encoding apparatus according to an exemplary embodiment.

FIG. 3 is a block diagram of a multi-view video data encoding apparatus 300 according to an exemplary embodiment.

Referring to FIG. 3, the multi-view video data encoding apparatus 300 includes an image obtaining unit 310 (e.g., an image obtainer), a color video frame encoding unit 320 (e.g., a color video frame encoder), and a depth map encoding unit 330 (e.g., a depth map encoder).

The image obtaining unit 310 obtains a multi-view color video frame by using multi-view video obtaining units such as the at least two multi-view cameras 130 of FIG. 1, and obtains a depth map frame corresponding to the multi-view color video frame by using a depth map frame obtaining unit such as the depth camera 140.

The color video frame encoding unit 320 prediction-encodes the obtained multi-view color video frame. In particular, as will be described below with reference to FIGS. 13 to 25, the color video frame encoding unit 320 according to the present embodiment may encode the multi-view color video frame based on coding units having a hierarchical structure, instead of general macro blocks. The color video frame encoding unit 320 may determine coding units having a tree structure, including coding units corresponding to a coded depth, from among hierarchical coding units corresponding to depths each denoting the number of times at least one maximum coding unit is spatially split, for each of the at least one maximum coding unit that is split from the multi-view color video frame. The color video frame encoding unit 320 may determine partitions for prediction-encoding each of the coding units corresponding to the coded depth, and may determine transformation units having a tree structure by performing transformation based on transformation units having a hierarchical structure.

The depth map frame encoding unit 330 intra-prediction-encodes the corresponding depth map frame by using the multi-view color video frame restored after being prediction-encoded. As descried above, in particular, the depth map frame encoding unit 330 according to the present embodiment considers a correlation between the depth map frame and the corresponding multi-view color video frame when the depth map frame is encoded, splits a block of the multi-view color video frame restored after being prediction-encoded into partitions to determine the correlation, determines a parameter indicating the correlation between a color image and a depth map image for each partition in consideration of correlations between adjacent peripheral pixels, and predicts block partitions of the corresponding depth map frame from the block partitions of the multi-view color video frame restored after being prediction-encoded by using the determined parameter.

Figure 4:
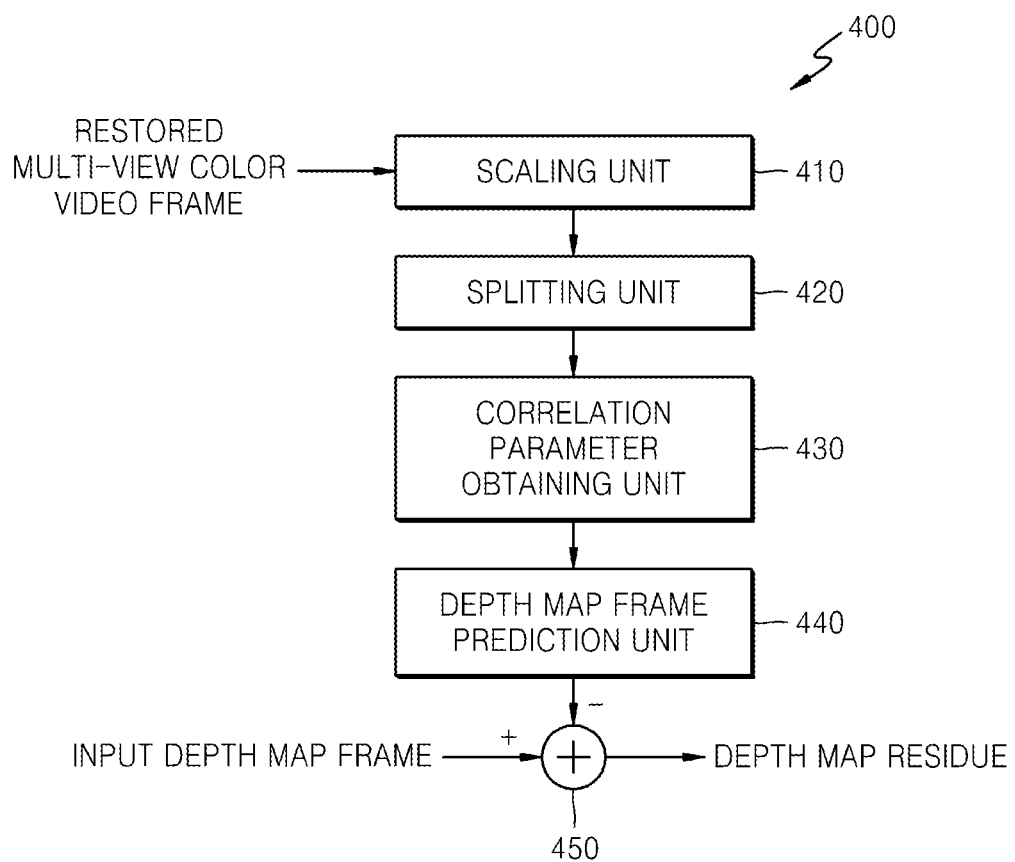
FIG. 4 is a block diagram of a depth map frame encoding unit of FIG. 3.

FIG. 4 is a block diagram of the depth map frame encoding unit 330 of FIG. 3.

Referring to FIG. 4, a depth map frame encoding unit 400 includes a scaling unit 410 (e.g., a scaler), a splitting unit 420 (e.g., a splitter), a correlation parameter obtaining unit 430 (e.g., a correlation parameter obtainer), a depth map frame prediction unit 440 (e.g., a depth map frame predictor), and a subtraction unit 450 (e.g., a subtractor).

The scaling unit 410 samples a block of a multi-view color video frame in such a way that a size of the block of the multi-view color video frame is identical to a size of a block of a depth map frame in a case where the size of the block of the depth map frame is different from the size of the block of the multi-view color video frame. For example, if the size of the block of the multi-view color video frame is 2N×2N (N is an integral number), and the size of the block of the corresponding depth map frame is N×N, the scaling unit 410 may generate the block of the multi-view color video frame by down-sampling the block of the multi-view color video frame at a rate of 1:2.

The splitting unit 420 splits the block of the multi-view color video frame restored after being encoded into at least one partition based on pixel values of the restored block of the multi-view color video frame. The splitting unit 420 further splits the block of the depth map frame into partitions in the same manner as the block partitions of the multi-view color video frame.

Figure 5A:
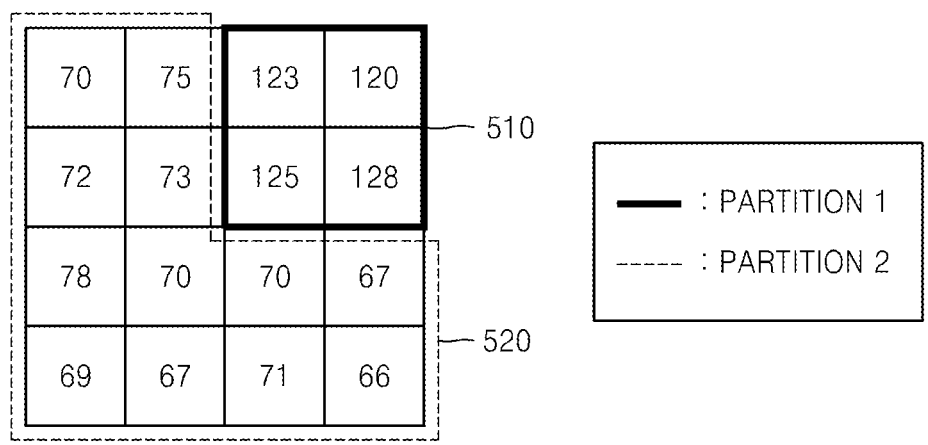
FIGS. 5A and 5B are diagrams for explaining a method of splitting a block of a multi-view color video frame into partitions performed by a splitting unit 420 of FIG. 4.
Figure 5B:
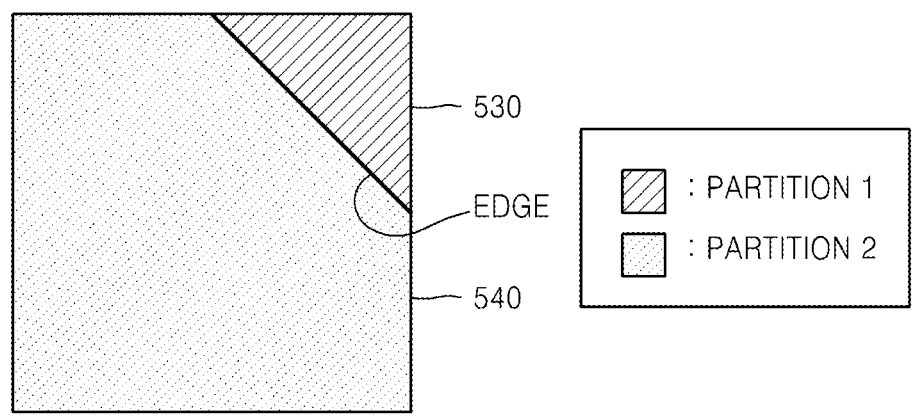

FIGS. 5A and 5B are diagrams for explaining a method of splitting a block of a multi-view color video frame into partitions performed by the splitting unit 420 of FIG. 4.

The splitting unit 420 may split the block of the multi-view color video frame into partitions based on a distribution of pixel values of the block of the multi-view color video frame so that pixels having pixel values similar to a predetermined pixel value may be included in the same partition. The splitting unit 420 may analyze the distribution of pixel values of the block of the multi-view color video frame, determine the predetermined pixel value that is a reference of the partition split, and classify pixels within a range of ±x (x is an integral number) from the predetermined pixel value into a single partition. For example, referring to FIG. 5A, the splitting unit 420 may classify pixels having pixel values within a range of ±10 with respect to a pixel value of 125 into a first partition 510 and classify pixels having pixel values within a range of ±10 with respect to a pixel value of 70 into a second partition 520. The method of splitting the block into partitions based on the distribution of pixel values is not limited thereto. The splitting unit 420 may split the block into a plurality of partitions based on the distribution of pixel values by applying various data clustering methods.

Referring to FIG. 5B, the splitting unit 420 may detect an edge present in the block of the multi-view color video frame by applying various edge detection methods such as a sobel algorithm, and classify the block of the multi-view color video frame into a first partition 530 and a second partition 540 based on the detected edge.

If the block of the multi-view color video frame is split into a plurality of partitions by using the splitting unit 420, the correlation parameter obtaining unit 430 obtains a parameter indicating a correlation between each of the block partitions of the multi-view color video frame and each of the block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the multi-view color video frame.

The depth map frame prediction unit 440 obtains prediction values of the block partitions of the corresponding depth map frame from the block partitions of the restored multi-view color video frame by using the obtained parameter.

Figure 6:
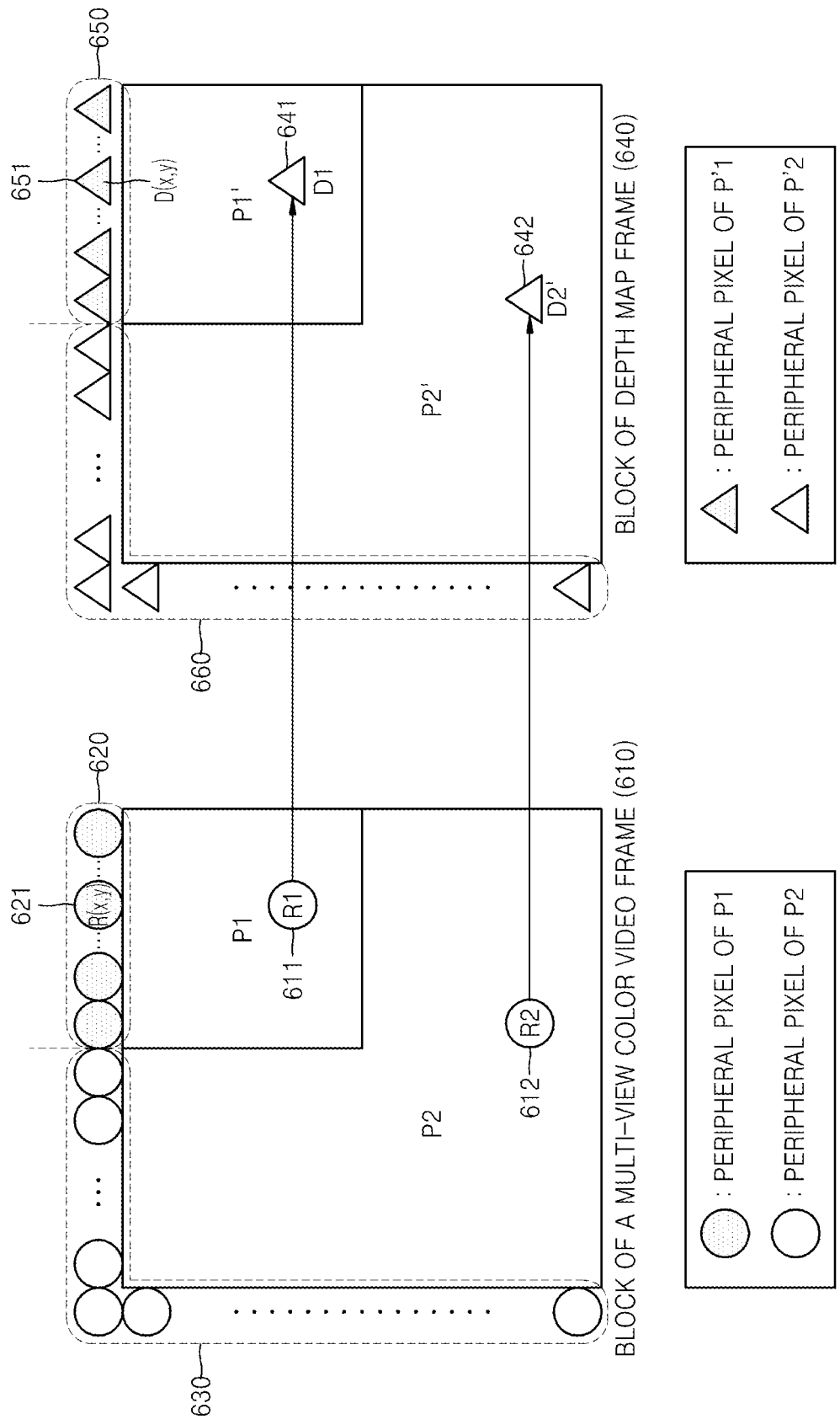
FIG. 6 is a diagram for explaining a parameter obtaining process performed by a correlation parameter obtaining unit 430 and an intra prediction process performed by a depth map frame prediction unit 440 of FIG. 4.

FIG. 6 is a conceptual diagram for explaining a parameter obtaining process performed by the correlation parameter obtaining unit 430 and an intra prediction process performed by the depth map frame prediction unit 440 of FIG. 4.

Referring to FIG. 6, it is assumed that a block 610 of a multi-view color video frame is split into two partitions P1 and P2 by the splitting unit 420. The splitting unit 420 splits a block 640 of a depth map frame into two partitions P1' and P2' so that the two partitions P1' and P2' have the same sizes and shape as the two partitions P1 and P2 of the block 610 of the multi-view color video frame.

The correlation parameter obtaining unit 430 obtains a parameter indicating a correlation with respect to each of the two partitions P1 and P2 of the block 610 of the multi-view color video frame. More specifically, the correlation parameter obtaining unit 430 obtains a first parameter indicating the correlation between the partition P1 of the block 610 of the multi-view color video frame and the partition P1' of the block 640 of the depth map frame by using peripheral pixel values 620 of the partition P1 of the block 610 of the multi-view color video frame and peripheral pixel values 650 of the partition P1' of the block 640 of the corresponding depth map frame. Further, the correlation parameter obtaining unit 430 obtains a second parameter indicating the correlation between the partition P2 of the block 610 of the multi-view color video frame and the partition P2' of the block 640 of the depth map frame by using peripheral pixel values 630 of the partition P2 of the block 610 of the multi-view color video frame and peripheral pixel values 660 of the partition P2' of the block 640 of the corresponding depth map frame.

If a pixel of the multi-view color video frame is R, and a prediction value of a corresponding pixel of the depth map frame having the same location as that of the pixel R is D, the prediction value D may be obtained through a function $f(\ )$ indicating a correlation between the multi-view color video frame and the depth map frame such as an equation: $D=f(R)$. If it is assumed that the function indicating the correlation is a linear function such as an equation: $f(x)=aX+b$ (a and b are real numbers), a linear relation is defined by using a weight a and an offset b.

The correlation parameter obtaining unit 430 according to an exemplary embodiment obtains the weight a and the offset b for each partition by using peripheral pixel values 620 and 630 of block partitions of the multi-view color video frame restored after being encoded and peripheral pixel values 650 and 660 of the depth map frame so that the weight a and the offset b indicating the linear relation may be obtained in a receiving side without being not separately signaled.

The correlation parameter obtaining unit 430 independently processes the block partitions of the multi-view color video frame and the block partitions of the depth map frame and obtains the parameter indicating the correlation by using the peripheral pixels 620, 630, 650, and 660 of the block partitions. Referring to FIG. 6, the correlation parameter obtaining unit 430 predicts the peripheral pixel values 650 of the block partition P'1 of the corresponding depth map frame by using the peripheral pixel values 620 of the block partition P1 of the multi-view color video frame. For example, a prediction value $D'(x,y)$ of a peripheral pixel value $D(x,y)$ 651 of the block partition P1' of the corresponding depth map frame at the same location using a peripheral pixel value $R(x,y)$ 621 of the block partition P1 of the multi-view color video frame is obtained through an equation: $D'(x,y)=a*R(x,y)+b$. The correlation parameter obtaining unit 430 predicts the peripheral pixel values 650 of the block partition P1' of the corresponding depth map frame by using each of the peripheral pixel values 620 of the block partition P1 of the multi-view color video frame, and determines the weight a and the offset b so that a difference $(D(x,y)-D'(x,y))$ between the predicted peripheral pixel values 650 of the block partition P1' of the corresponding depth map frame and the original peripheral pixel values 660 of the block partition P1' of the corresponding depth map frame is minimized. In this regard, the correlation parameter obtaining unit 430 may predict the peripheral pixel values 650 of the block partition P1' of the corresponding depth map frame with respect to each of the peripheral pixel values 620 of the block partition P1 of the multi-view color video frame, and determine the weight a and the offset b so that a sum of square of the difference $(D(x,y)-D'(x,y))$ is minimized (Least Square Solution).

Similarly, the correlation parameter obtaining unit 430 predicts the peripheral pixel values 660 of the block partition P2' of the corresponding depth map frame by using the peripheral pixel values 630 of the block partition P2 of the multi-view color video frame. The correlation parameter obtaining unit 430 predicts the peripheral pixel values 660 of the block partition P2' of the corresponding depth map frame by using each of the peripheral pixel values 630 of the block partition P2 of the multi-view color video frame, and determines the weight a and the offset b so that a difference between the predicted peripheral pixel values 660 of the block partition P2' of the corresponding depth map frame and the original peripheral pixel values 660 of the block partition P2' of the corresponding depth map frame is minimized.

As described above, the correlation parameter obtaining unit 430 independently predicts a parameter indicating a correlation by using peripheral pixels for each partition. If peripheral pixel values of the block partitions of the multi-view color video frame is Rec_Y' and prediction values of the corresponding peripheral pixel values of the block partitions of the depth map frame is Pred_D, the correlation parameter obtaining unit 430 predicts peripheral pixels of the depth map frame through an equation: Pred_D=a*Rec_Y'+b, and determines the parameters a and b so that a difference between the original peripheral pixels and the predicted peripheral pixels is minimized. Although the process of determining the parameter is described assuming a primary linear relation above, the inventive concept is not limited thereto and may be applied to a process of obtaining an optimal parameter using peripheral pixels when a parameter for defining an n-th linear relation equation or another non-linear relation equation is obtained.

If the correlation parameter obtaining unit 430 obtains the parameter indicating the correlation for each partition, the depth map frame prediction unit 440 obtains prediction values of the block partitions of the corresponding depth map frame from the block partitions of the restored multi-view color video frame using the obtained parameter. Referring back to FIG. 6, it is assumed that a weight and an offset determined with respect to the block partition P1 of the multi-view color video frame restored after being encoded are a1 and b1, respectively. The depth map frame prediction unit 440 generates a prediction value of a corresponding pixel D1' 641 of the block partition P1' of the depth map frame from a pixel R1 611 of the block partition P1 of the multi-view color video frame using a linear relation equation such as an equation: D1'=a1 *R1+b1. Similarly, if it is assumed that a weight and an offset determined with respect to the block partition P2 of the multi-view color video frame restored after being encoded are a2 and b2, respectively, the depth map frame prediction unit 440 generates a prediction value of a corresponding pixel D2' 642 of the block partition P2' of the depth map frame from a pixel R2 612 of the block partition P2 of the multi-view color video frame by using a linear relation equation such as an equation: D2'=a2 *R2+b2. As described above, the depth map frame prediction unit 440 predicts the block partitions of the depth map frame from the block partitions of the multi-view color video frame by using the parameter indicating the correlation determined in a partition unit.

Referring back to FIG. 4, the subtraction unit 450 generates a depth map residue by calculating a difference value between original pixel values of a depth map frame and predicted pixel values of the depth map frame. The depth map residue is encoded through transformation, quantization, and entropy encoding processes like a general residue.

Figure 7:
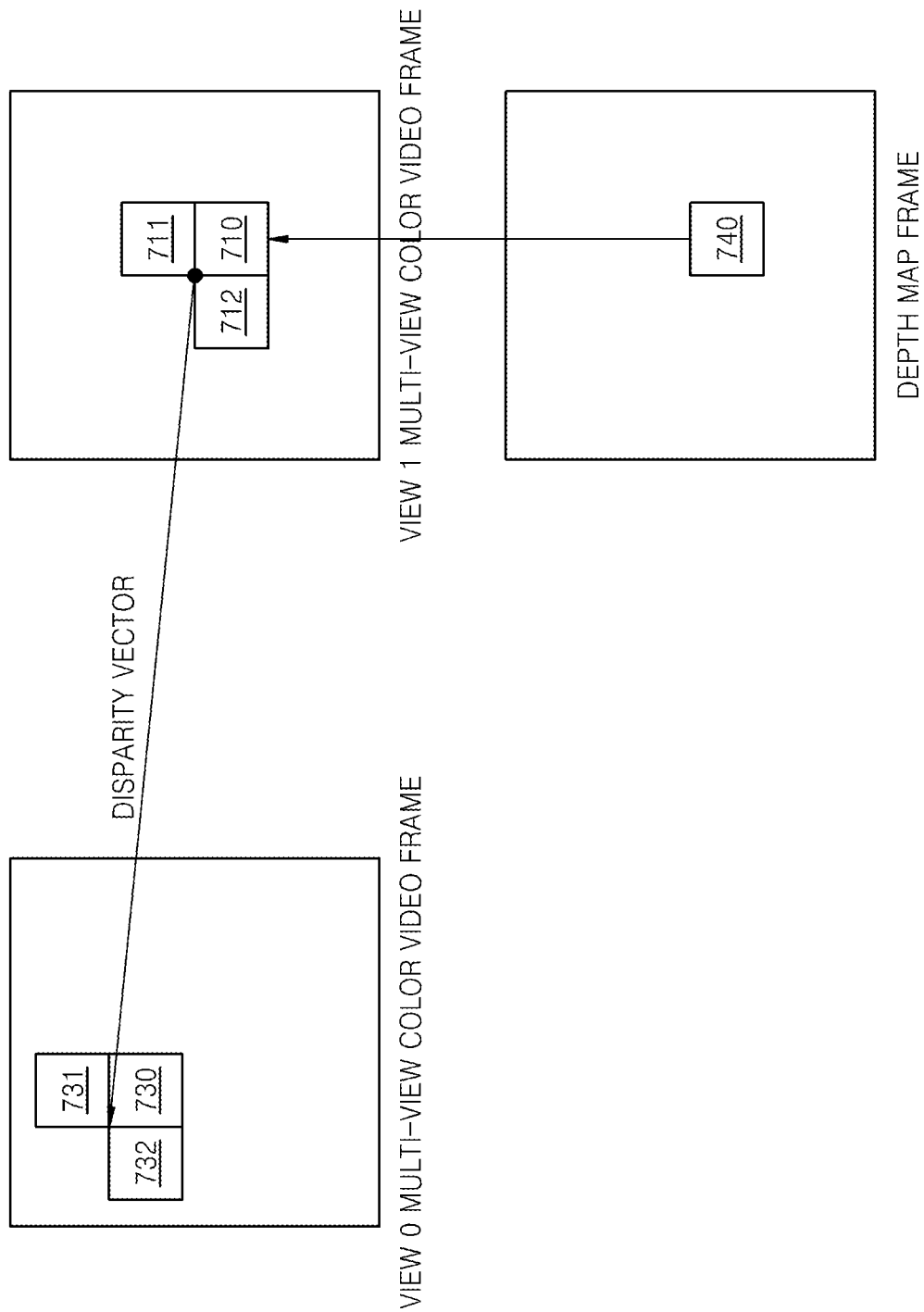
FIG. 7 illustrates a multi-view color video frame block used to predict a depth map frame block according to an exemplary embodiment.

FIG. 7 illustrates a multi-view color video frame block used to predict a depth map frame block 740 according to an exemplary embodiment.

Referring to FIG. 7, the depth map frame block 740 may be predicted by using a color video frame block 710 that is co-viewed (same view) and co-located (same location) with a current depth map frame block to be encoded 740. If a size of the color video frame block 710 that is co-viewed and co-located with the current depth map frame block to be encoded 740 is different from a size of the current depth map frame block to be encoded 740, a scaled block may be used to have the same size as described above. Further, the current depth map frame block to be encoded 740 may be predicted by using peripheral blocks 711 and 712 of the color video frame block 710 that is co-viewed and co-located with the current depth map frame block to be encoded 740. If sizes of the peripheral blocks 711 and 712 are different from the size of the current depth map frame block to be encoded 740, a scaled peripheral block may be used to have the same size with the current depth map frame block to be encoded 740. A different view color video frame block 730 and peripheral blocks 731 and 732 thereof determined by moving the color video frame block 710 that is co-viewed and co-located with the current depth map frame block to be encoded 740 based on a disparity vector indicating a view difference between multi-view video may also be used to predict the current depth map frame block to be encoded 740. If sizes of the different view color video frame block 730 and peripheral blocks 731 and 732 are different from the size of the current depth map frame block to be encoded 740, the different view color video frame block 730 and peripheral blocks 731 and 732 are scaled to have the same size as that of the current depth map frame block to be encoded 740, and the scaled different view color video frame block 730 and peripheral blocks 731 and 732 may be used to predict the current depth map frame block to be encoded 740.

Figure 8:
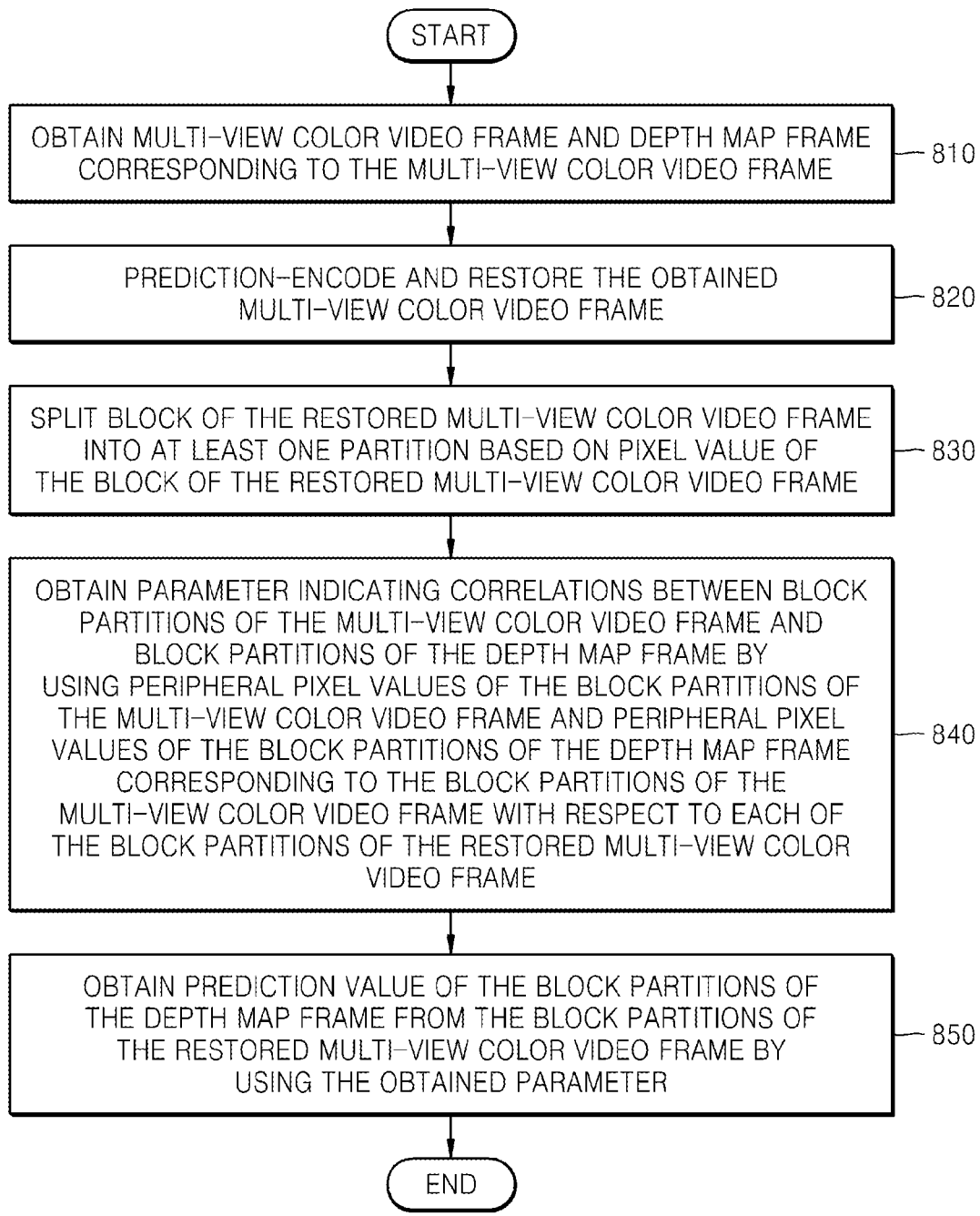
FIG. 8 is a flowchart illustrating a method of encoding a depth map of multi-view video data, according to an exemplary embodiment.

FIG. 8 is a flowchart illustrating a method of encoding a depth map of multi-view video data, according to an exemplary embodiment.

Referring to FIG. 8, in operation 810, the image obtaining unit 310 obtains a multi-view color video frame and a depth map frame corresponding to the multi-view color video frame.

In operation 820, the color video frame encoding unit 320 prediction-encodes and restores the obtained multi-view color video frame.

In operation 830, the depth map frame encoding unit 330 splits a block of the restored multi-view color video frame into at least one partition based on a pixel value of the restored multi-view color video frame.

In operation 840, the depth map frame encoding unit 330 obtains a parameter indicating a correlation between each of the block partitions of the multi-view color video frame and block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the restored multi-view color video frame.

In operation 850, the depth map frame encoding unit 330 obtains prediction values of the corresponding block partitions of the depth map frame from the block partitions of the restored multi-view color video frame by using the obtained parameter. The depth map frame encoding unit 330 encodes the depth map frame by transforming, quantizing, and entropy-encoding a residue that is a difference value between the prediction values and the original block partitions of the depth map frame.

Figure 9:
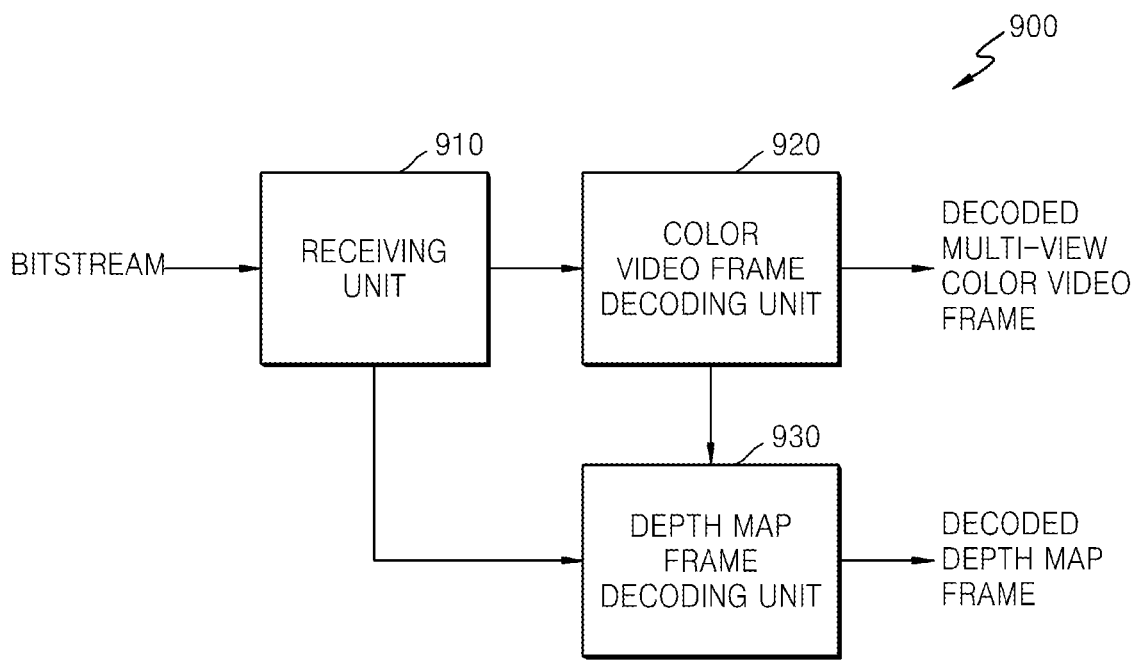
FIG. 9 is a block diagram of a multi-view video data decoding apparatus, according to an exemplary embodiment.

FIG. 9 is a block diagram of a multi-view video data decoding apparatus 900 according to an exemplary embodiment.

Referring to FIG. 9, the multi-view video data decoding apparatus 900 includes a receiving unit 910 (e.g., a receiver), a color video frame decoding unit 920 (e.g., a color video frame decoder), and a depth map frame decoding unit 930 (e.g., a depth map frame decoder).

The receiving unit 910 receives a bitstream containing a result of encoding a multi-view color video frame and a depth map frame corresponding to the multi-view color video frame.

The color video frame decoding unit 920 decodes the encoded multi-view color video frame obtained from the bitstream. As will be described with reference to FIGS. 13 to 25 below, particularly, the color video frame decoding unit 920 according to an exemplary embodiment may decode the multi-view color video frame based on hierarchical coding units. The color video frame decoding unit 920 obtains information about the size of each of at least one maximum coding unit split from the multi-view color video frame, a depth denoting the number of times each of the at least one maximum coding unit is spatially split, partitions used to prediction-encode hierarchical coding units according to depths, and transformation units having a hierarchical structure from the bitstream. Also, based on the obtained information, the color video frame decoding unit 920 determines coding units having a tree structure including coding units corresponding to a coded depth from among hierarchical coding units corresponding to depths each denoting the number of times one of the at least one maximum coding unit is spatially split, for each of the at least one maximum coding unit split from the multi-view color video frame, determines partitions for prediction-decoding each of the coding units corresponding to the coded depth; and determines transformation units having a tree structure.

The depth map frame decoding unit 930 prediction-decodes the corresponding depth map frame, based on a result of decoding the multi-view color video frame. Specifically, the depth map frame decoding unit 930 decodes the corresponding depth map frame using the restored multi-view color video frame. In particular, the depth map frame decoding unit 930 according to an exemplary embodiment considers a correlation between the depth map frame and the corresponding multi-view color video frame when the depth map frame is decoded, splits a block of the decoded multi-view color video frame into partitions based on a pixel value so as to determine the correlation, determines a parameter indicating a color image and the depth map image for each partition in consideration of correlations between adjacent peripheral pixels, and predicts block partitions of the corresponding depth map frame from block partitions of the decoded multi-view color video frame using the determined parameter.

Figure 10:
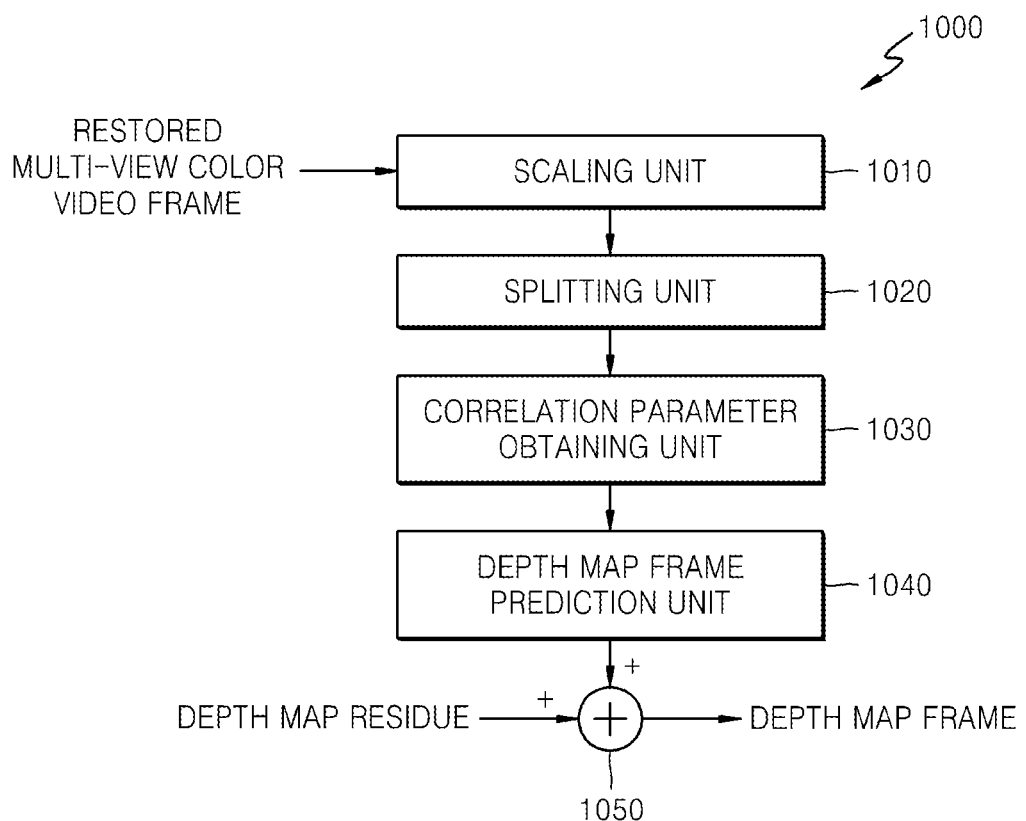
FIG. 10 is a block diagram of a depth map frame decoding unit 930 of FIG. 9, according to an exemplary embodiment.

FIG. 10 is a block diagram of a detailed construction of the depth map frame decoding unit 930 of FIG. 9, according to an exemplary embodiment.

Referring to FIG. 10, a depth map frame decoding unit 1000 includes a scaling unit 1010 (e.g., a scaler), a splitting unit 1020 (e.g., a splitter), a correlation parameter obtaining unit 1030 (e.g., a correlation parameter obtainer), a depth map frame prediction unit 1040 (e.g., a depth map frame predictor), and an adding unit 1050 (e.g., an adder).

The scaling unit 1010 samples a block of a multi-view color video frame in such a way that a size of the block of the multi-view color video frame is identical to a size of a block of a depth map frame in a case where the size of the block of the depth map frame is different from the size of the block of the multi-view color video frame. The splitting unit 1020 splits the block of the multi-view color video frame into at least one partition based on a pixel value of the decoded multi-view color video frame. The splitting unit 1020 further splits the block of the depth map frame into partitions in the same manner as the block partitions of the multi-view color video frame.

If the block of the multi-view color video frame is split into the plurality of partitions by the splitting unit 1020, the correlation parameter obtaining unit 1030 obtains a parameter indicating a correlation between each of the block partitions of the multi-view color video frame and each of the block partitions of the depth map frame by using peripheral pixel values of the block partitions of the multi-view color video frame and peripheral pixel values of the block partitions of the previously decoded depth map frame corresponding to the block partitions of the multi-view color video frame with respect to each of the block partitions of the multi-view color video frame.

The depth map frame prediction unit 1040 obtains prediction values of the corresponding depth map frame block partitions from the block partitions of the decoded multi-view color video frame by using the obtained parameter. Similarly to the prediction value obtaining process performed by the depth map frame prediction unit 440 of FIG. 4 described above, the depth map frame prediction unit 1040 predicts block partitions of the corresponding depth map frame from the block partitions of the multi-view color video frame by using a weight and an offset determined for each of the block partitions of the decoded multi-view color video frame.

The adding unit 1050 obtains a depth map residue that is a difference value between a pixel value of an original depth map frame and a pixel value of a predicted depth map frame from a bitstream, adds the prediction values obtained by the depth map frame prediction unit 1040 to the depth map residue, and restores the block partitions of the depth map frame. The depth map residue may be restored through entropy decoding, inverse quantization, and inverse transformation like a general residue.

Figure 11:
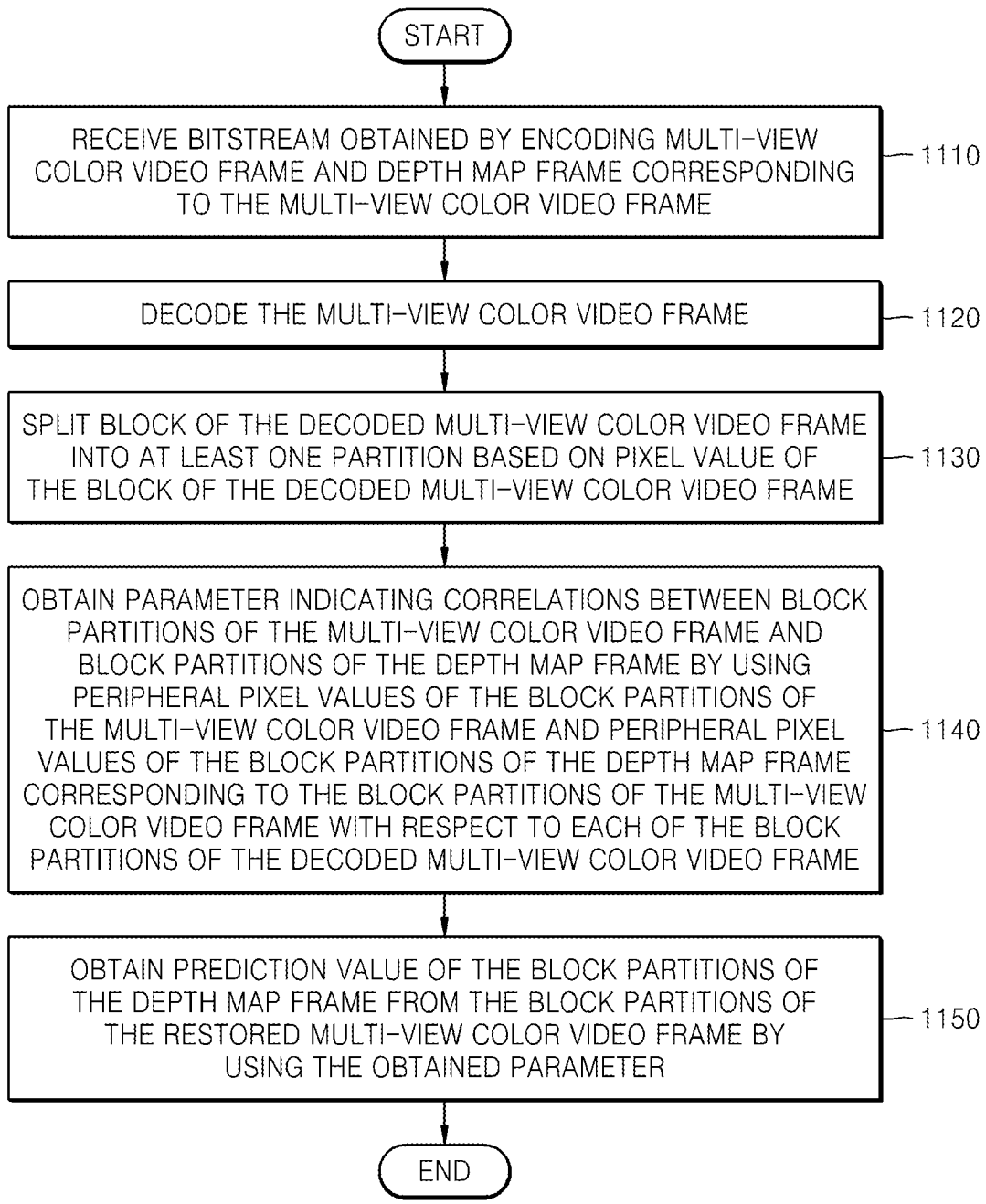
FIG. 11 is a flowchart illustrating a method of decoding a depth map of multi-view video data, according to an exemplary embodiment.

FIG. 11 is a flowchart illustrating a method of decoding a depth map of multi-view video data, according to an exemplary embodiment.

Referring to FIG. 11, in operation 1110, the receiving unit 910 receives and parses a bitstream obtained by encoding a multi-view color video frame and a depth map frame corresponding to the multi-view color video frame.

In operation 1120, the color video frame decoding unit 920 decodes the multi-view color video frame. As will be described below, the color video frame decoding unit 920 may decode the multi-view color video frame based on coding units of a hierarchical structure.

In operation 1130, the depth map frame decoding unit 930 splits a block of the decoded multi-view color video frame into at least one partition based on a pixel value of the block of the decoded multi-view color video frame.

In operation 1140, the depth map frame decoding unit 930 obtains a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the decoded multi-view color video frame.

In operation 1150, the depth map frame decoding unit 930 obtains prediction values of the corresponding block partitions of the depth map frame from the block partitions of the decoded multi-view color video frame by using the obtained parameter. The depth map frame decoding unit 930 restores the block partitions of the depth map frame by adding the obtained prediction values to a depth map residue.

Figure 12:
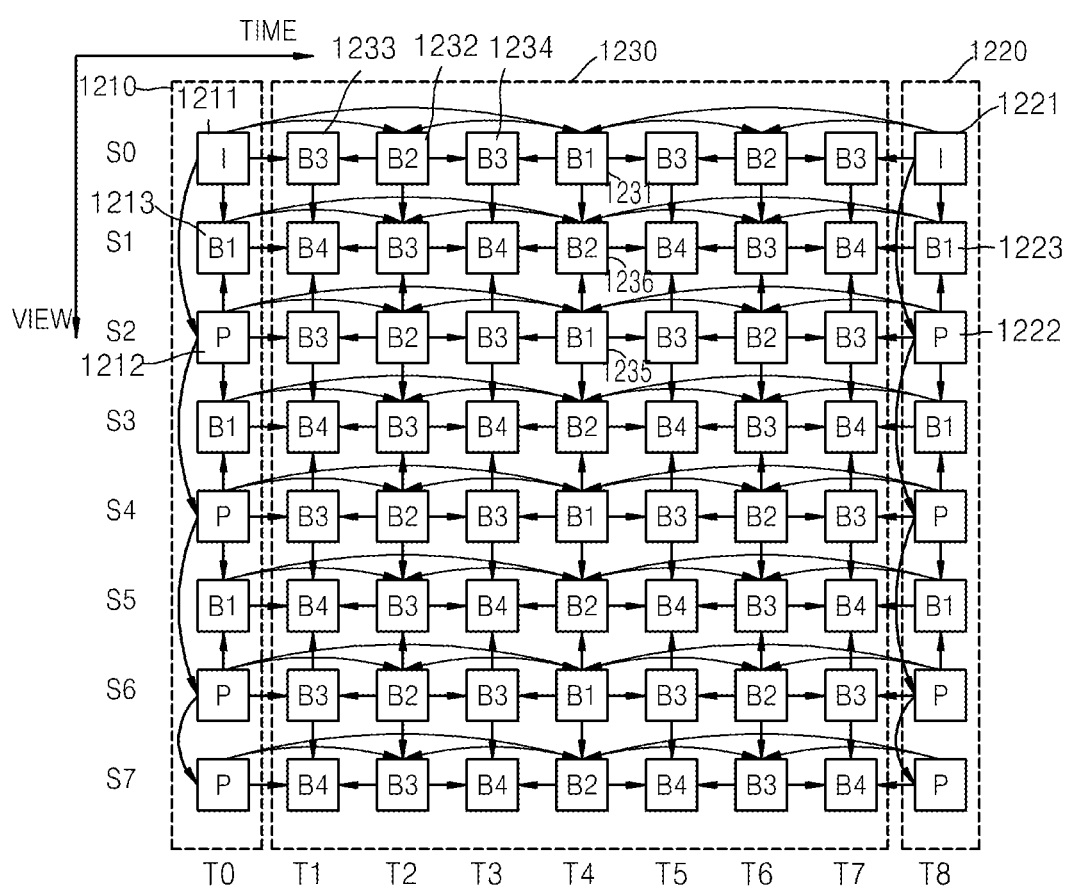
FIG. 12 illustrates multi-view color video frames encoded based on a method of encoding multi-view video and decoded based on a method of decoding multi-view video, according to an exemplary embodiment.

FIG. 12 illustrates multi-view color video frames encoded based on a method of encoding multi-view video and decoded based on a method of decoding multi-view video, according to an exemplary embodiment.

The color video frame encoding unit 320 of FIG. 3 compression-encodes multi-view video, based on a temporal correlation and a spatial correlation between inter-views of cameras.

In FIG. 12, the x-axis denotes time, and the y-axis denotes viewpoints. In the x-axis, 'T0' to 'T8' denote sampling times of an image. In the y-axis, 'S0' to 'S8' denote different viewpoints. In FIG. 12, each row denotes an image picture group captured from the same viewpoint, and each column denotes multi-view videos captured at the same point of time.

The color video frame encoding unit 320 of FIG. 3 periodically generates intra pictures for an image captured from a basic viewpoint, and prediction-encodes other pictures by performing temporal prediction or inter-view prediction based on the intra pictures.

Temporal prediction is performed using a temporal relationship between images captured from the same viewpoint, i.e., images in the same row in FIG. 12. For temporal prediction, a predicting scheme using hierarchical B pictures may be used. Inter-view prediction is performed using a spatial relationship between images at the same point of time, i.e., images in the same column in FIG. 12.

In the predicting scheme for predicting a multi-view video picture by using hierarchical B pictures, when prediction is performed using a temporal relationship between images from the same viewpoint, i.e., images in the same row, a image picture group from the same viewpoint is prediction-encoded as bi-directional picture (hereinafter referred to as 'B picture'), based on anchor pictures. Here, the anchor pictures mean pictures arranged in a column 1210 at a first point of time T0 and a column 1220 at a last point of time T8, which each include an intra picture, from among the columns in FIG. 12. The anchor pictures arranged in the columns 1210 and 1220 are prediction-encoded only through inter-view prediction, except for the intra pictures (hereinafter referred to as 'I pictures'). Pictures arranged in the other columns except for the columns 1210 and 1220 including the I pictures are referred to as 'non-anchor pictures'.

For example, a case where image pictures captured from a first viewpoint S0 for a predetermined time are encoded using the hierarchical B pictures will now be described. Among the image pictures captured from the first viewpoint S0, a picture 1211 captured at the first point of time T0 and a picture 1221 captured at the last point of time T8 are encoded as the I pictures. Then, a picture 1231 captured at a point of time T4 is bi-directionally prediction-encoded as a B picture, based on the I pictures 1211 and 1221 which are anchor pictures. A picture 1232 captured at a point of time T2 is bi-directionally prediction-encoded as a B picture, based on the I picture 1211 and the B picture 1231. Similarly, a picture 1233 captured at a point of time T1 is bi-directionally prediction-encoded based on the I picture 1211 and the B picture 1232, and a picture 1234 captured at a point of time T3 is bi-directionally prediction-encoded based on the B picture 132 and the B picture 1231. As described above, since image sequences captured from the same viewpoint are hierarchically and bi-directionally prediction-encoded using anchor pictures, this prediction-encoding method is referred to as hierarchical B pictures. In 'Bn' of FIG. 12, n denotes a B picture that is $n^{th}$ bi-directionally predicted (n=1, 2, 3, and 4). For example, 'B1' denotes a picture that is first bi-directionally predicted using anchor pictures which are I pictures or P pictures, 'B2' denotes a picture that is bi-directionally predicted after the B1 picture, 'B3' denotes a picture that is bi-directionally predicted after the B2 picture, and 'B4' denotes a picture that is bi-directionally predicted after the B3 picture.

To encode a multi-view video frame, first, image picture groups captured from the first viewpoint S0 which is a basic viewpoint are encoded using the hierarchical B pictures described above. To encode image sequences captured from the other viewpoints, first, image pictures captured from odd-numbered viewpoints S2, S4, and S6 and a last viewpoint S7 in the columns 1210 and 1220 are prediction-encoded using P pictures through inter-view prediction using the I pictures 1211 and 1221 from the first viewpoint S0. Image pictures captured from even-numbered viewpoints S1, S3, and S5 in the columns 1210 and 1220 are bi-directionally predicted as B pictures by using image pictures from adjacent viewpoints through inter-view prediction. For example, a B picture 1213 captured from a second viewpoint S1 at the point of time T0 is bi-directionally predicted using the I picture 1211 from the viewpoint S1 and a P picture 1212 from the viewpoint S2, which are adjacent viewpoints.

When image pictures from all the viewpoints in the columns 1210 and 1220 are each encoded using at least one from the I pictures, the B pictures, and the P pictures, the non-anchor pictures 1230 are bi-directionally prediction-encoded through temporal prediction using hierarchical B pictures and inter-view prediction, as described above.

Among the non-anchor pictures, the pictures captured from the odd-numbered viewpoints S2, S4, and S6 and the last viewpoint S7 are each bi-directionally prediction-encoded using anchor pictures from the same viewpoint through temporal prediction using hierarchical B pictures. Among the non-anchor pictures 1230, the image pictures captured from the even-numbered viewpoints S1, S3, S5, and S7 are bi-directionally prediction-encoded using not only through temporal prediction using hierarchical B pictures but also through inter-view prediction using pictures from adjacent viewpoints. For example, a picture 1236 captured from the viewpoint S2 at the point of time T4 is predicted using the anchor pictures 1213 and 1223 and pictures 1231 and 1235 from adjacent viewpoints.

The P pictures included in the columns 1210 and 1220 are each prediction-encoded using either an I picture captured from a different viewpoint at the same point of time or a previous P picture, as described above. For example, a P picture 1222 captured from the viewpoint S2 at the last point of time T8 is prediction-encoded using the I picture 1221 captured from the first viewpoint S0 at the last point of time T8, as a reference picture.

A video encoding method and apparatus capable of prediction-encoding prediction units and partitions based on coding units having a tree structure, and a video decoding method and apparatus capable of prediction-decoding prediction units and partitions based on coding units having a tree structure will now be described in detail with reference to FIGS. 13 to 25. The video encoding method and apparatus which will be described below may be applied to the color video frame encoding unit 320 of FIG. 3, and the video decoding method and apparatus which will be described below may be applied to the color video frame decoding unit 920 of FIG. 9.

Figure 13:
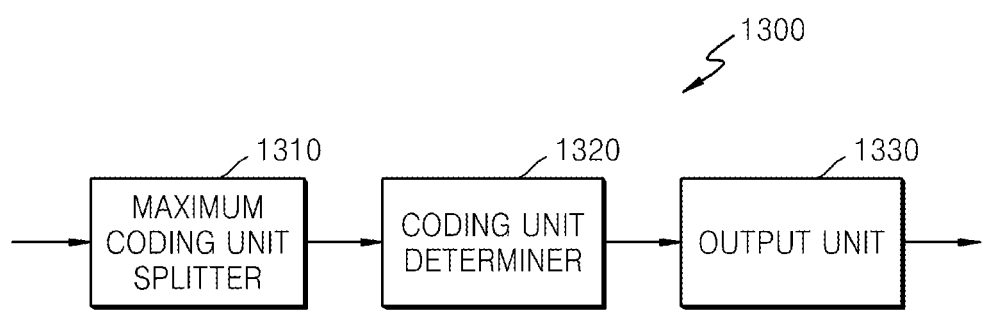
FIG. 13 is a block diagram of a video encoding apparatus capable of performing video prediction based on coding units having a tree structure, according to an exemplary embodiment.

FIG. 13 is a block diagram of a video encoding apparatus 100 capable of performing video prediction based on coding units having a tree structure, according to an exemplary embodiment.

The video encoding apparatus 1300 capable of performing video prediction based on coding units having a tree structure includes a maximum coding unit splitter 1310, a coding unit determiner 1320, and an output unit 1330 (e.g., an output).

For convenience of explanation, the video encoding apparatus 1300 capable of performing video prediction based on coding units having a tree structure will be hereinafter referred to as 'the video encoding apparatus 1300'.

The maximum coding unit splitter 1310 may split a current picture of an image based on a maximum coding unit for the current picture. If the current picture is larger than the maximum coding unit, image data of the current picture may be split into at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 1320 according to the at least one maximum coding unit.

A coding unit according to an exemplary embodiment may be characterized by a maximum size and a depth. The depth denotes a number of times the coding unit is spatially split from the maximum coding unit, and as the depth deepens, coding units corresponding to depths may be split from the maximum coding unit to a minimum coding unit. A depth of the maximum coding unit may be determined as an uppermost depth, and the minimum coding unit may be determined as a lowermost coding unit. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include coding units that are split according to depths. Since the maximum coding unit according to an exemplary embodiment is split according to depths, the image data of a spatial domain included in the maximum coding unit may be hierarchically classified according to the depths.

A maximum depth and a maximum size of a coding unit, which limit the total number of times a height and a width of the maximum coding unit are hierarchically split, may be predetermined.

The coding unit determiner 1320 encodes at least one split region obtained by splitting a region of the maximum coding unit according to depths, and determines a depth to output a finally encoded image data according to the at least one split region. In other words, the coding unit determiner 1320 determines a coded depth by encoding the image data in the coding units corresponding to depths in units of the maximum coding units of the current picture, and selecting a depth having the least encoding error. The determined coded depth and the image data in each of the maximum coding units are output to the output unit 1330.

The image data in each of the maximum coding units is encoded based on the coding units corresponding to depths, according to at least one depth equal to or below the maximum depth, and results of encoding the image data based on the coding units corresponding to depths are compared. A depth having the least encoding error may be selected after comparing encoding errors of the coding units corresponding to depths. At least one coded depth may be selected for each of the maximum coding units.

The size of the maximum coding unit is split as a coding unit is hierarchically split according to depths, and the number of coding units increases. Also, even if coding units included in one maximum coding unit correspond to the same depth, whether each of the coding units will be split to a lower depth is determined by measuring an encoding error of the image data of each of the coding units. Thus, since even data included in one maximum coding unit has a different encoding error corresponding to a depth, according to the location of the data, a coded depth may be differently set according to the location of the data. Accordingly, at least one coded depth may be set for one maximum coding unit, and the image data of the maximum coding unit may be divided according to coding units of the at least one coded depth.

Accordingly, the coding unit determiner 1320 according to an exemplary embodiment may determine coding units having a tree structure included in a current maximum coding unit. The 'coding units having a tree structure' according to an exemplary embodiment include coding units corresponding to a depth determined to be the coded depth, from among all coding units corresponding to depths included in the current maximum coding unit. Coding units corresponding to a coded depth may be hierarchically determined according to depths in the same region of the maximum coding unit, and may be independently determined in different regions of the maximum coding unit. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit obtained by splitting the maximum coding unit once may be set to 1, and a depth of a coding unit obtained by splitting the maximum coding unit twice may be set to 2. If a coding unit obtained by splitting the maximum coding unit four times is the minimum coding unit, then depth levels of depths 0, 1, 2, 3 and 4 exist. Thus, the first maximum depth may be set to 4, and the second maximum depth may be set to 5.

Prediction-encoding and transformation may be performed on the maximum coding unit. Similarly, prediction-encoding and transformation are performed in units of maximum coding units, based on coding units corresponding to depths and according to depths equal to or less than the maximum depth.

Since the number of coding units corresponding to depths increases whenever the maximum coding unit is split according to depths, encoding including prediction-encoding and transformation should be performed on all of the coding units corresponding to depths generated as a depth deepens. For convenience of explanation, prediction-encoding and transformation will now be described based on a coding unit of a current depth, included in at least one maximum coding unit.

The video encoding apparatus 1300 may variously select a size or shape of a data unit for encoding image data. In order to encode the image data, operations, such as prediction-encoding, transformation, and entropy encoding, are performed. At this time, the same data unit may be used for the all operations or different data units may be used for each operation.

For example, the video encoding apparatus 1300 may select not only a coding unit for encoding the image data, but also a data unit different from the coding unit so as to perform prediction-encoding on image data in the coding unit.

In order to prediction-encode the maximum coding unit, prediction-encoding may be performed based on a coding unit corresponding to a coded depth, i.e., based on a coding unit that is no longer split to coding units corresponding to a lower depth. Hereinafter, the coding unit that is no longer split and becomes a basis unit for prediction-encoding will now be referred to as a 'prediction unit'. Partitions obtained by splitting the prediction unit may include a data unit obtained by splitting at least one of a height and a width of the prediction unit. The partitions may be data units obtained by splitting a prediction unit of a coding unit, and the prediction unit may be a partition having the same size as that of the coding unit.

For example, when a coding unit of 2N×2N (where N is a positive integer) is no longer split, this coding unit becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on partition of 2N×2N, 2N×N, N×2N, or N×N. Also, the skip mode may be performed only on a partition of 2N×2N. Encoding may be independently performed on one prediction unit in each coding unit, and a prediction mode having a least encoding error may be selected.

Also, the video encoding apparatus 1300 may perform transformation on the image data in a coding unit based not only on the coding unit for encoding the image data, but also based on a data unit that is different from the coding unit. In order to perform transformation on the coding unit, transformation may be performed based on a data unit having a size smaller than or equal to that of the coding unit. For example, transformation units may include a data unit for the intra mode and a data unit for the inter mode.

Similarly to coding units having a tree structure according to an exemplary embodiment, a transformation unit in a coding unit may be recursively split into smaller sized transformation units. Thus, residual data in the coding unit may be divided according to transformation units having a tree structure according to transformation depths.

A transformation unit according to an exemplary embodiment may also be assigned a transformation depth denoting a number of times the height and width of a coding unit are split to obtain the transformation unit. For example, a transformation depth may be 0 when a size of a transformation unit for a 2N×2N current coding unit is 2N×2N, a transformation depth may be 1 when a size of a transformation unit for the 2N×2N current coding unit is N×N, and a transformation depth may be 2 when a size of a transformation unit for the 2N×2N current coding unit is N/2×N/2. That is, transformation units having a tree structure may also be set according to transformation depths.

Encoding information for each coded depth requires not only information about the coded depth, but also about information related to prediction-encoding and transformation. Accordingly, the coding unit determiner 1320 may not only determine a coded depth having a least encoding error, but also determine a partition type in a prediction unit, a prediction mode for each prediction unit, and a size of a transformation unit for transformation.

Coding units having a tree structure included in a maximum coding unit and a method of determining a prediction unit/partition and a transformation unit, according to exemplary embodiments, will be described in detail later.

The coding unit determiner 1320 may measure encoding errors of coding units corresponding to depths by using Rate-Distortion Optimization based on Lagrangian multipliers.

The output unit 1330 outputs the image data of the maximum coding unit, which is encoded based on the at least one coded depth determined by the coding unit determiner 1320, and information about the encoding mode of each of depths, in a bitstream.

The encoded image data may be a result of encoding residual data of an image.

The information about the encoding mode of each of depths may include information about the coded depth, about the partition type in the prediction unit, the prediction mode, and the size of the transformation unit.

The information about the coded depth may be defined using split information according to depths, which indicates whether encoding is to be performed on coding units of a lower depth instead of a current depth. If a current depth of a current coding unit is the coded depth, then the current coding unit is encoded using coding units corresponding to the current depth, and split information about the current depth may thus be defined such that the current coding unit of the current depth may not split any longer into coding units of a lower depth. Reversely, if the current depth of the current coding unit is not the coded depth, then coding units of a lower depth should be encoded and the split information about the current depth may thus be defined such that the current coding unit of the current depth may split into coding units of a lower depth.

If the current depth is not the coded depth, encoding is performed on the coding units of the lower depth. Since at least one coding unit of the lower depth exists in one coding unit of the current depth, encoding is repeatedly performed on each coding unit of the lower depth, and coding units having the same depth may thus be recursively encoded.

Since coding units having a tree structure should be determined in one maximum coding unit and information about at least one encoding mode is determined for each coding unit of a coded depth, information about at least one encoding mode may be determined for one maximum coding unit. Also, image data of the maximum coding unit may have a different coded depth according to the location thereof since the image data is hierarchically split according to depths. Thus, information about a coded depth and an encoding mode may be set for the image data.

Accordingly, the output unit 1330 according to an exemplary embodiment may assign encoding information about a corresponding coded depth and an encoding mode to at least one of coding units, prediction units, and a minimum unit included in the maximum coding unit.

The minimum unit according to an exemplary embodiment is a rectangular data unit obtained by splitting a minimum coding unit of a lowermost depth by 4. Alternatively, the minimum unit may be a maximum rectangular data unit that may be included in all of the coding units, prediction units, partition units, and transformation units included in the maximum coding unit.

For example, encoding information output via the output unit 1330 may be classified into encoding information of each of coding units corresponding to depths, and encoding information of each of prediction units. The encoding information of each of coding units corresponding to depths may include prediction mode information and partition size information. The encoding information of each of prediction units may include information about an estimated direction of an inter mode, about a reference image index of the inter mode, about a motion vector, about a chroma component of the intra mode, and about an interpolation method of an intra mode.

Information about a maximum size of coding units defined in units of pictures, slices, or GOPs, and information about a maximum depth may be inserted into a header of a bitstream, a sequence parameter set (SPS) or a Picture parameter set (PPS).

Also, information about a maximum size and a minimum size of a transformation unit available in a current video may be transmitted via a header of a bitstream, an SPS, or a PPS. The output unit 1330 may encode and output information about scalability of coding units.

In the video encoding apparatus 1300 according to an exemplary embodiment, coding units corresponding to depths may be coding units obtained by dividing a height or width of a coding unit of an upper depth by two. In other words, when the size of a coding unit of a current depth is 2N×2N, the size of a coding unit of a lower depth is N×N. Also, the 2N×2N coding unit may include four N×N coding units of the lower depth at most.

Accordingly, the video encoding apparatus 1300 may form coding units having a tree structure by determining coding units having an optimum shape and size for each maximum coding unit, based on the size of each maximum coding unit and a maximum depth determined considering characteristics of a current picture. Also, since each maximum coding unit may be encoded according to any one of various prediction modes and transformation methods, an optimum encoding mode may be determined considering characteristics of coding units of various image sizes.

Thus, if an image having very high resolution or very large data amount is encoded in units of related art macroblocks, a number of macroblocks per picture excessively increases. Thus, an amount of compressed information generated for each macroblock increases, and thus it is difficult to transmit the compressed information and data compression efficiency decreases. However, the video encoding apparatus 1300 is capable of controlling a coding unit based on characteristics of an image while increasing a maximum size of the coding unit in consideration of a size of the image, thereby increasing image compression efficiency.

Figure 14:
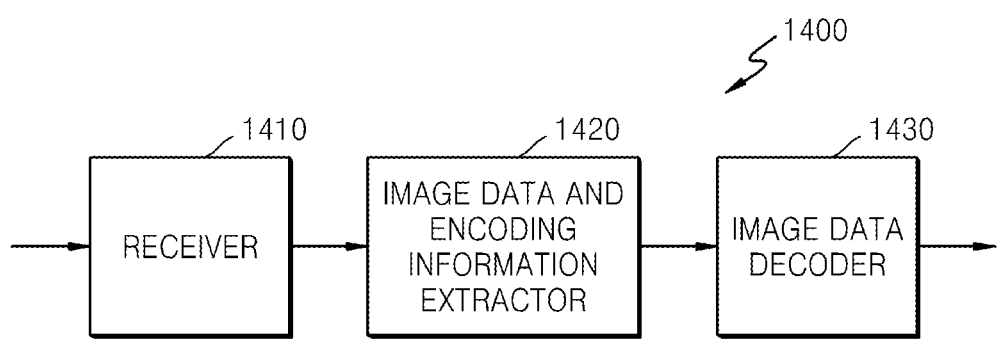
FIG. 14 is a block diagram of a video decoding apparatus capable of performing video prediction based on coding units having a tree structure, according to an exemplary embodiment.

FIG. 14 is a block diagram of a video decoding apparatus 1400 capable of performing video prediction based on coding units having a tree structure, according to an exemplary embodiment.

The video decoding apparatus 1400 capable of performing video prediction based on coding units having a tree structure includes a receiver 1410, an image data and encoding information extractor 1420, and an image data decoder 1430. For convenience of explanation, the video decoding apparatus 1400 capable of performing video prediction based on coding units having a tree structure will now be referred to as 'video decoding apparatus 1400'.

Definitions of various terms, such as a coding unit, a depth, a prediction unit, a transformation unit, and information about various encoding modes, which are used below to explain decoding operations of the video decoding apparatus 1400, are identical to those of the video encoding apparatus 1300 described above with reference to FIG. 13.

The receiver 1410 receives and parses a bitstream of an encoded video. The image data and encoding information extractor 1420 extracts encoded image data for each of coding units having a tree structure in units of maximum coding units, from the parsed bitstream, and then outputs the extracted image data to the image data decoder 1430. The image data and encoding information extractor 1420 may extract information about a maximum size of coding units of a current picture, from a header regarding the current picture, an SPS, or a PPS.

Also, the image data and encoding information extractor 1420 extracts information about a coded depth and an encoding mode for the coding units having the tree structure in units of the maximum coding unit, from the parsed bitstream. The extracted information about the coded depth and the encoding mode is output to the image data decoder 1430. In other words, the image data in the bitstream may be split into the maximum coding units so that the image data decoder 1430 may decode the image data in units of the maximum coding units.

The information about the coded depth and the encoding mode for each of the maximum coding units may be set for information about at least one coded depth. The information about the encoding mode for each coded depth may include information about a partition type of a corresponding coding unit corresponding to coded depth, about a prediction mode, and a size of a transformation unit. Also, splitting information according to depths may be extracted as the information about the coded depth.

The information about the coded depth and the encoding mode for each of the maximum coding units extracted by the image data and encoding information extractor 1420 is information about a coded depth and an encoding mode determined to generate a minimum encoding error when an encoding side, e.g., the video encoding apparatus 1300, repeatedly encodes each of coding units corresponding to depths in units of maximum coding units. Accordingly, the video decoding apparatus 1400 may restore an image by decoding the image data according to a coded depth and an encoding mode that generates the minimum encoding error.

Since encoding information about the coded depth and the encoding mode may be assigned to data units from among corresponding coding units, prediction units, and a minimum unit, the image data and encoding information extractor 1420 may extract the information about the coded depth and the encoding mode in units of the data units. If the information about the coded depth and the encoding mode for each of the maximum coding units is recorded in units of the data units, data units including information about the same coded depth and encoding mode may be inferred to as data units included in the same maximum coding unit.

The image data decoder 1430 restores the current picture by decoding the image data in each of the maximum coding units, based on the information about the coded depth and the encoding mode for each of the maximum coding units. In other words, the image data decoder 1430 may decode the encoded image data based on parsed partition type, prediction mode, and transformation unit for each of the coding units having the tree structure included in each of the maximum coding units. A decoding process may include a prediction process including intra prediction and motion compensation, and an inverse transformation process.

The image data decoder 1430 may perform intra prediction or motion compensation on each of the coding units according to partitions and a prediction mode thereof, based on the information about the partition type and the prediction mode of prediction units of each of coding units according to coded depths.

Also, in order to perform inverse transformation on each of the maximum coding units, the image data decoder 1430 may parse information about transformation units having a tree structure of each of the coding units and perform inverse transformation based on the transformation units of each of the coding units. Through inverse transformation, pixel values of a spatial domain of each of the coding units may be restored.

The image data decoder 1430 may determine a coded depth of a current maximum coding unit, based on split information according to depths. If the split information indicates that image data is no longer split in the current depth, the current depth is a coded depth. Thus, the image data decoder 1430 may decode image data of a current maximum coding unit by using the information about the partition type of the prediction unit, the prediction mode, and the size of the transformation unit of a coding unit corresponding to a current depth.

In other words, data units containing encoding information including the same split information may be gathered by observing encoding information assigned to a data unit from among the coding unit, the prediction unit, and the minimum unit, and the gathered data units may be considered as one data unit to be decoded according to the same encoding mode by the image data decoder 1430.

The video decoding apparatus 1400 may obtain information about a coding unit that generates a least encoding error by recursively encoding each of the maximum coding units, and may use the information to decode the current picture. In other words, the encoded image data in the coding units having the tree structure determined to be optimum coding units in units of the maximum coding units may be decoded.

Accordingly, even if image data has high resolution and a very large amount of data, the image data may be efficiently decoded to be restored by using a size of a coding unit and an encoding mode, which are adaptively determined according to characteristics of the image data, based on information about an optimum encoding mode received from an encoding side.

Figure 15:
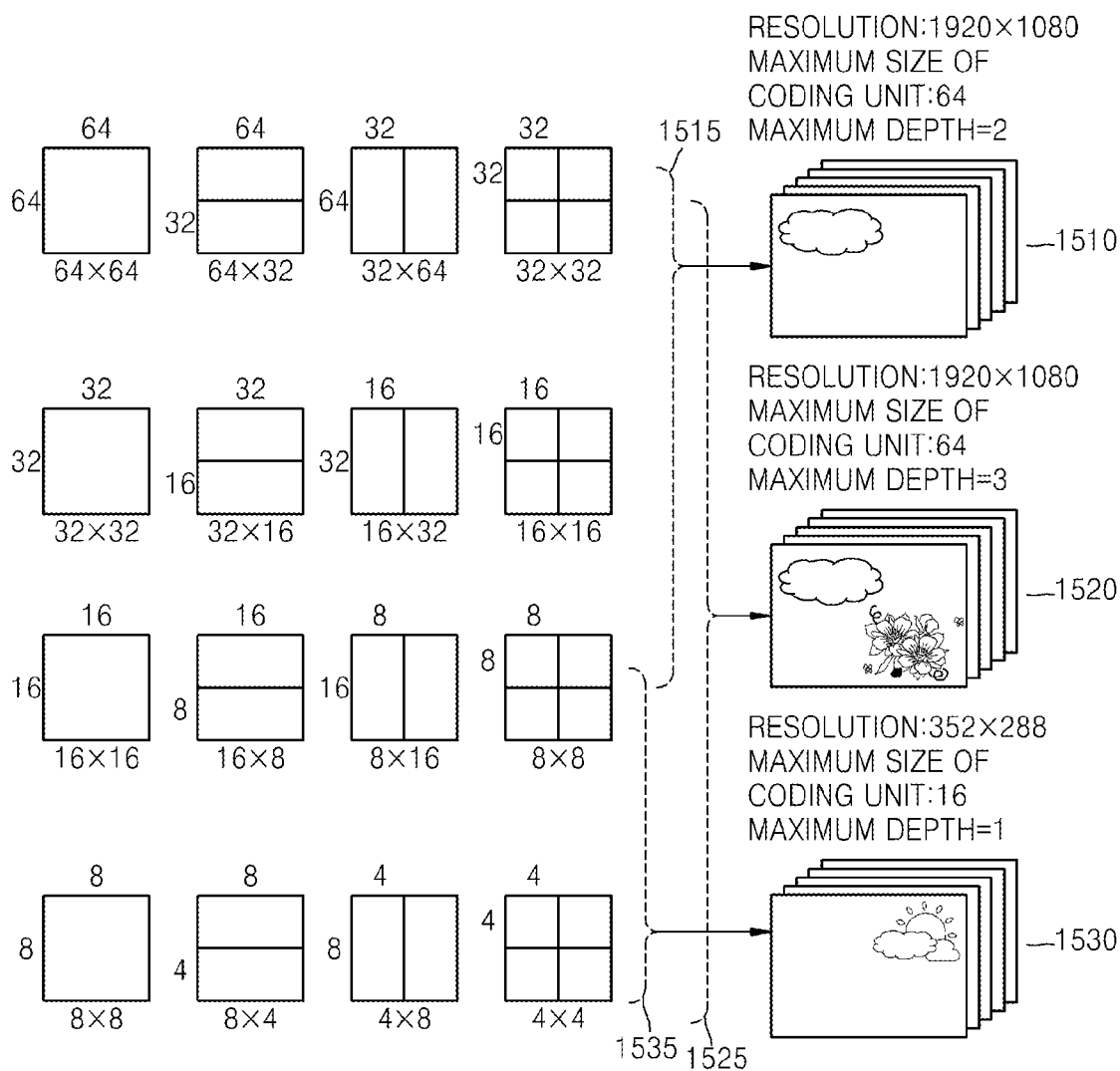
FIG. 15 illustrates a concept of coding units according to an exemplary embodiment.

FIG. 15 illustrates a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1510, a resolution is 1920×1080, a maximum size of a coding unit is 64, and a maximum depth is 2. In video data 1520, a resolution is 1920×1080, a maximum size of a coding unit is 64, and a maximum depth is 3. In video data 1530, a resolution is 352×288, a maximum size of a coding unit is 16, and a maximum depth is 1. The maximum depth shown in FIG. 15 denotes a total number of splits from a maximum coding unit to a minimum decoding unit.

If a resolution is high or an amount of data is large, a maximum size of a coding unit may be relatively large so as to not only increase encoding efficiency but also to accurately reflect characteristics of an image. Accordingly, the maximum size of the coding unit of the video data 1510 and 1520 having the higher resolution than the video data 330 may be 64.

Since the maximum depth of the video data 1510 is 2, coding units 1515 of the vide data 1510 may include a maximum coding unit having a long axis size of 64, and coding units having long axis sizes of 32 and 16 since depths are deepened to two layers by splitting the maximum coding unit twice. Meanwhile, since the maximum depth of the video data 1530 is 1, coding units 1535 of the video data 1530 may include a maximum coding unit having a long axis size of 16, and coding units having a long axis size of 8 since depths are deepened to one layer by splitting the maximum coding unit once.

Since the maximum depth of the video data 1520 is 3, coding units 1525 of the video data 1520 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 16:
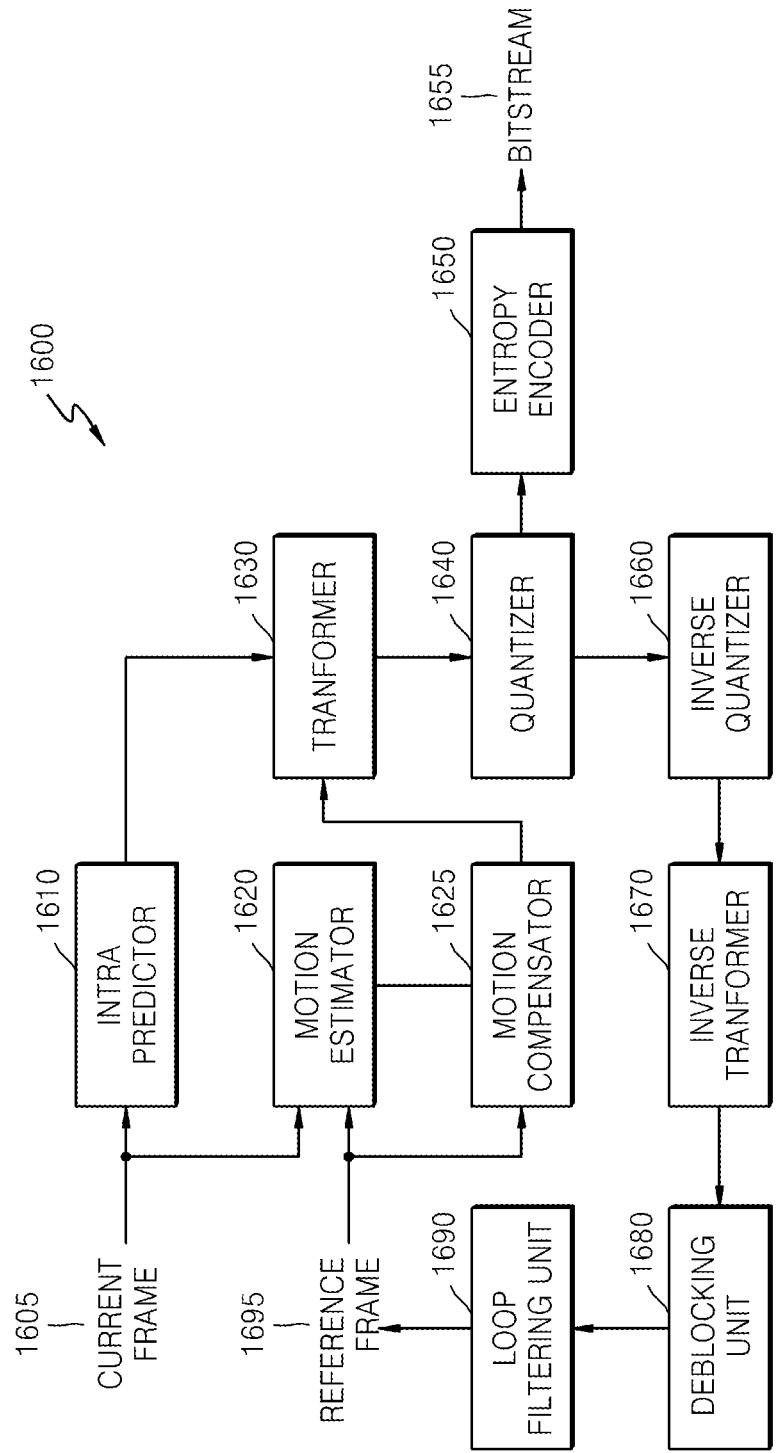
FIG. 16 is a block diagram of an image encoder based on coding units, according to an exemplary embodiment.

FIG. 16 is a block diagram of an image encoder 400 based on coding units, according to an exemplary embodiment.

The image encoder 1600 performs operations of the coding unit determiner 1320 of the video encoding apparatus 1300 to encode image data. Specifically, an intra predictor 1610 performs intra prediction on coding units in an intra mode from among a current frame 1605, and a motion estimator 1620 and a motion compensator 1625 performs inter estimation and motion compensation on coding units in an inter mode from among the current frame 1605 by using the current frame 1605 and a reference frame 1695.

Data output from the intra predictor 1610, the motion estimator 1620, and the motion compensator 1625 is output as a quantized transformation coefficient through a transformer 1630 and a quantizer 1640. The quantized transformation coefficient is restored as data in a spatial domain through an inverse quantizer 1660 and an inverse transformer 1670. The restored data in the spatial domain is output as the reference frame 1695 after being post-processed through a deblocking unit 1680 and a loop filtering unit 1690. The quantized transformation coefficient may be output in a bitstream 1655 through an entropy encoder 1650.

In order to apply the image encoder 1600 to the video encoding apparatus 1300, all elements of the image encoder 1600, i.e., the intra predictor 1610, the motion estimator 1620, the motion compensator 1625, the transformer 1630, the quantizer 1640, the entropy encoder 1650, the inverse quantizer 1660, the inverse transformer 1670, the deblocking unit 1680, and the loop filtering unit 1690 perform operations based on each coding unit from among coding units having a tree structure while considering the maximum depth of each maximum coding unit.

Particularly, the intra predictor 1610, the motion estimator 1620, and the motion compensator 1625 determine partitions and a prediction mode of each coding unit from among the coding units having the tree structure while considering the maximum size and the maximum depth of a current maximum coding unit. The transformer 1630 determines the size of the transformation unit in each coding unit from among the coding units having the tree structure.

Figure 17:
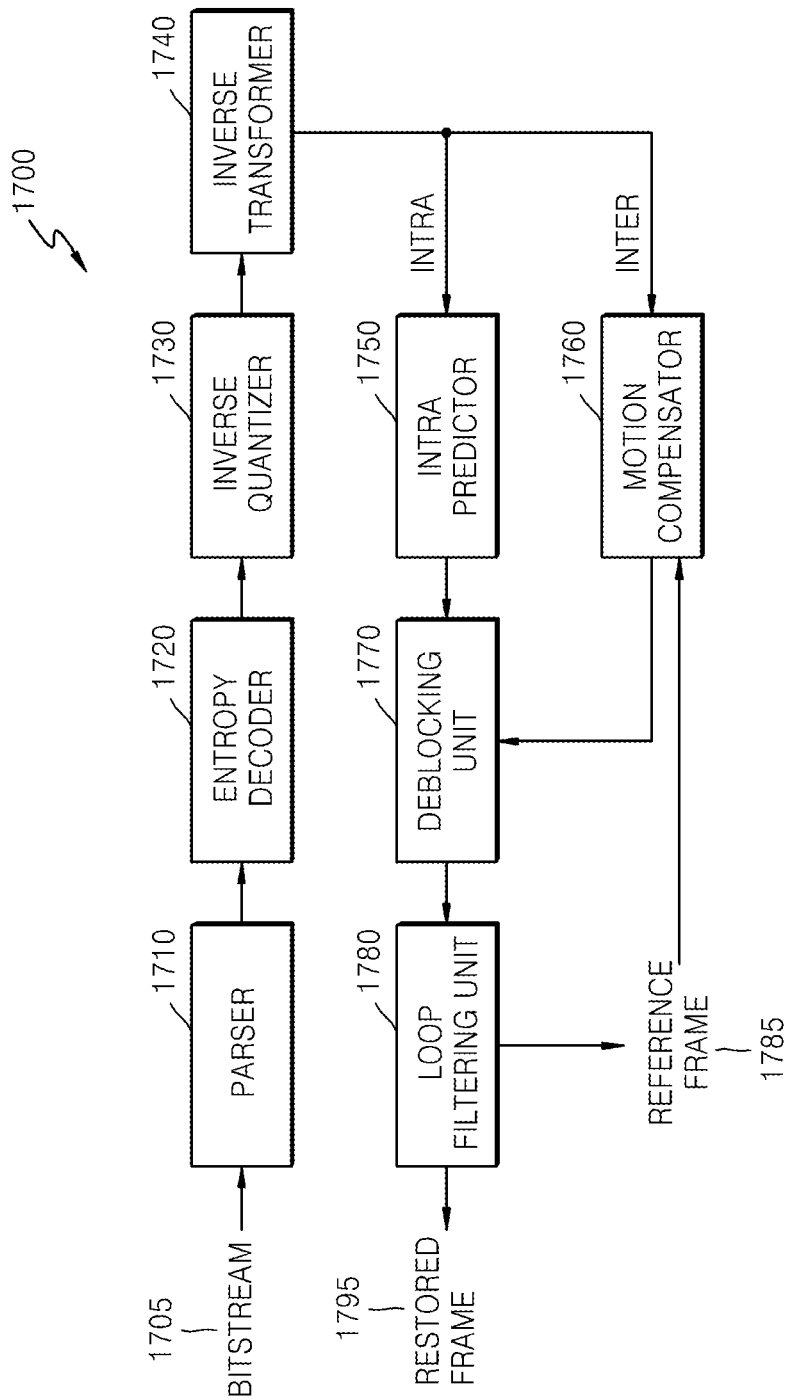
FIG. 17 is a block diagram of an image decoder based on coding units, according to an exemplary embodiment.

FIG. 17 is a block diagram of an image decoder 1700 based on coding units, according to an exemplary embodiment.

A parser 1710 parses a bitstream 1705 to obtain encoded image data to be decoded and encoding information required to decode the encoded image data. The encoded image data is output as inversely quantized data through an entropy decoder 1720 and an inverse quantizer 1730, and the inverse quantized data is restored to image data in a spatial domain through an inverse transformer 1740.

With respect to the image data in the spatial domain, an intra predictor 1750 performs intra prediction on coding units in an intra mode, and a motion compensator 1760 performs motion compensation on coding units in an inter mode by using a reference frame 1785.

The image data in the spatial domain, which passed through the intra predictor 1750 and the motion compensator 1760, may be output as a restored frame 1795 after being post-processed through a deblocking unit 1770 (e.g., a deblocker) and a loop filtering unit 1780 (e.g., a loop filterer). Also, the image data that is post-processed through the deblocking unit 1770 and the loop filtering unit 1780 may be output as the reference frame 1785.

In order to decode the image data by using the image data decoder 1430 of the video decoding apparatus 1400, the image decoder 1700 may perform operations that are performed after an operation of the parser 1710.

In order to apply the image decoder 1700 to the video decoding apparatus 1400, all elements of the image decoder 1700, i.e., the parser 1710, the entropy decoder 1720, the inverse quantizer 1730, the inverse transformer 1740, the intra predictor 1750, the motion compensator 1760, the deblocking unit 1770, and the loop filtering unit 1780 perform operations based on coding units having a tree structure, in units of maximum coding units.

Particularly, the intra prediction 1750 and the motion compensator 1760 determine partitions and a prediction mode for each of the coding units having the tree structure, and the inverse transformer 1740 determines a size of a transformation unit for each of the coding units.

Figure 18:
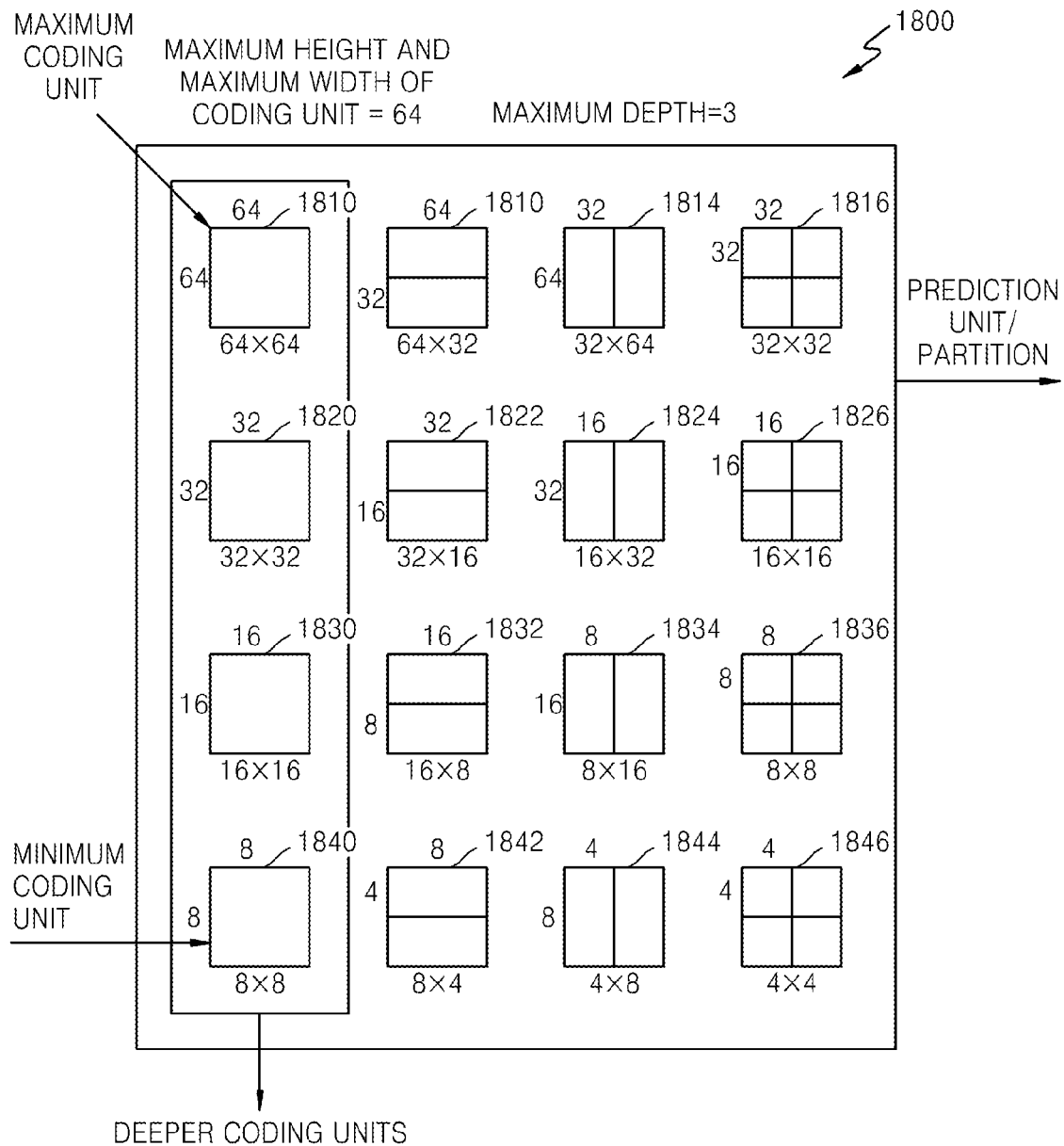
FIG. 18 is a diagram illustrating coding units corresponding to depths, and partitions, according to an exemplary embodiment.

FIG. 18 is a diagram illustrating coding units corresponding to depths, and partitions, according to an exemplary embodiment.

The video encoding apparatus 1300 and the video decoding apparatus 1400 according to an exemplary embodiment use hierarchical coding units to consider characteristics of an image. A maximum height, a maximum width, and a maximum depth of a coding unit may be adaptively determined according to the characteristics of the image, or may be differently set by a user. Sizes of coding units corresponding to depths may be determined according to the predetermined maximum size of the coding unit.

In a hierarchical structure 1800 of coding units according to an exemplary embodiment, the maximum height and the maximum width of the coding units are each 64, and the maximum depth is 4. The maximum depth denotes a total number of splitting times from a maximum coding unit to a minimum coding unit. Since a depth deepens along a vertical axis of the hierarchical structure 1800, a height and width of each of coding units corresponding to depths are each split. Also, a prediction unit and partitions, which are bases for prediction-encoding each of the coding units corresponding to depths, are shown along a horizontal axis of the hierarchical structure 1800.

Specifically, in the hierarchical structure 1800, a coding unit 1810 is a maximum coding unit, and has a depth is 0 and a size of 64×64 (height×width). As depth deepens along the vertical axis, a coding unit 1820 having a size of 32×32 and a depth of 1, a coding unit 1830 having a size of 16×16 and a depth of 2, a coding unit 1840 having a size of 8×8 and a depth of 3, and a coding unit 1850 having a size of 4×4 and a depth of 4 exist. The coding unit 1850 having the size of 4×4 and the depth of 4 is a minimum coding unit.

A prediction unit and partitions of each coding unit are arranged along the horizontal axis according to each depth. If the coding unit 1810 having the size of 64×64 and the depth of 0 is a prediction unit, the prediction unit may be split into partitions included in the coding unit 1810, i.e. a partition 1810 having a size of 64×64, partitions 1812 having a size of 64×32, partitions 1814 having a size of 32×64, or partitions 1816 having a size of 32×32.

Similarly, a prediction unit of the coding unit 1820 having the size of 32×32 and the depth of 1 may be split into partitions included in the coding unit 1820, i.e. a partition 1820 having a size of 32×32, partitions 1822 having a size of 32×16, partitions 1824 having a size of 16×32, and partitions 1826 having a size of 16×16.

Similarly, a prediction unit of the coding unit 1830 having the size of 16×16 and the depth of 2 may be split into partitions included in the coding unit 1830, i.e. a partition 1830 having a size of 16×16, partitions 1832 having a size of 16×8, partitions 1834 having a size of 8×16, and partitions 1836 having a size of 8×8.

Similarly, a prediction unit of the coding unit 1840 having the size of 8×8 and the depth of 3 may be split into partitions included in the coding unit 1840, i.e. a partition 1840 having a size of 8×8, partitions 1842 having a size of 8×4, partitions 1844 having a size of 4×8, and partitions 1846 having a size of 4×4.

The coding unit 1850 having the size of 4×4 and the depth of 4 is the minimum coding unit having a lowermost depth. A prediction unit of the coding unit 1850 is set to only a partition 1850 having a size of 4×4.

In order to determine a coded depth of the maximum coding unit 1810, the coding unit determiner 1320 of the video encoding apparatus 1300 encodes all coding units corresponding to each depth, included in the maximum coding unit 1810.

As depth increases, a number of coding units, which correspond to each depth and include data having the same range and the same size, increases. For example, four coding units corresponding to a depth of 2 are required to cover data included in one coding unit corresponding to a depth of 1. Accordingly, in order to compare results of encoding the same data according to depths, the coding unit corresponding to the depth of 1 and the four coding units corresponding to the depth of 2 are each encoded.

In order to perform encoding in units of depths, a least encoding error of each of the depths may be selected as a representative encoding error by encoding prediction units in each of the coding units corresponding to the depths, along the horizontal axis of the hierarchical structure 1800. Alternatively, a least encoding error may be searched for by performing encoding in units of depths and comparing least encoding errors according to the depths, as the depth deepens along the vertical axis of the hierarchical structure 1800. A depth and a partition having the least encoding error in the maximum coding unit 1810 may be selected as a coded depth and a partition type of the maximum coding unit 1810.

FIG. 19 is a diagram illustrating a correlation between a coding unit 1910 and transformation units 1920, according to an exemplary embodiment.

The video encoding apparatus 1300 (or the video decoding apparatus 1400) according to an exemplary embodiment encodes (or decodes) an image in units of maximum coding units, based on coding units having sizes smaller than or equal to the maximum coding units. During the encoding, a size of each transformation unit used to perform transformation may be selected based on a data unit that is not larger than a corresponding coding unit.

For example, in the video encoding apparatus 1300 (or the video decoding apparatus 1400), if a size of the coding unit 1910 is 64×64, transformation may be performed using the transformation units 1920 having a size of 32×32.

Also, data of the coding unit 1910 having the size of 64×64 may be encoded by performing transformation on each of transformation units having a size of 32×32, 16×16, 8×8, and 4×4, which are smaller than 64×64, and then a transformation unit having a least coding error may be selected.

FIG. 20 is a diagram illustrating encoding information corresponding to depths, according to an exemplary embodiment.

The output unit 1330 of the video encoding apparatus 1300 may encode and transmit information 2000 about a partition type, information 2010 about a prediction mode, and information 2020 about transformation unit size for each coding unit corresponding to a coded depth, as information about an encoding mode.

The information 2000 indicates information about a shape of a partition obtained by splitting a prediction unit of a current coding unit, as a data unit for prediction-encoding the current coding unit. For example, a current coding unit CU_0 having a size of 2N×2N may be split into any one of a partition 2002 having a size of 2N×2N, a partition 2004 having a size of 2N×N, a partition 2006 having a size of N×2N, and a partition 2008 having a size of N×N. In this case, the information 2000 is set to indicate one of the partition 2004 having a size of 2N×N, the partition 2006 having a size of N×2N, and the partition 2008 having a size of N×N The information 2010 indicates a prediction mode of each partition. For example, the information 2010 may indicate a mode of prediction-encoding the partition indicated by the information 2000, i.e., an intra mode 2012, an inter mode 2014, or a skip mode 2016.

The information 2020 indicates a transformation unit to be based on when transformation is performed on a current coding unit. For example, the transformation unit may be a first intra transformation unit 2022, a second intra transformation unit 2024, a first inter transformation unit 2026, or a second intra transformation unit 828.

The image data and encoding information extractor 1420 of the video decoding apparatus 1400 may extract and use the information 2000, 2010, and 2020 for decoding coding units corresponding to depths.

Figure 21:
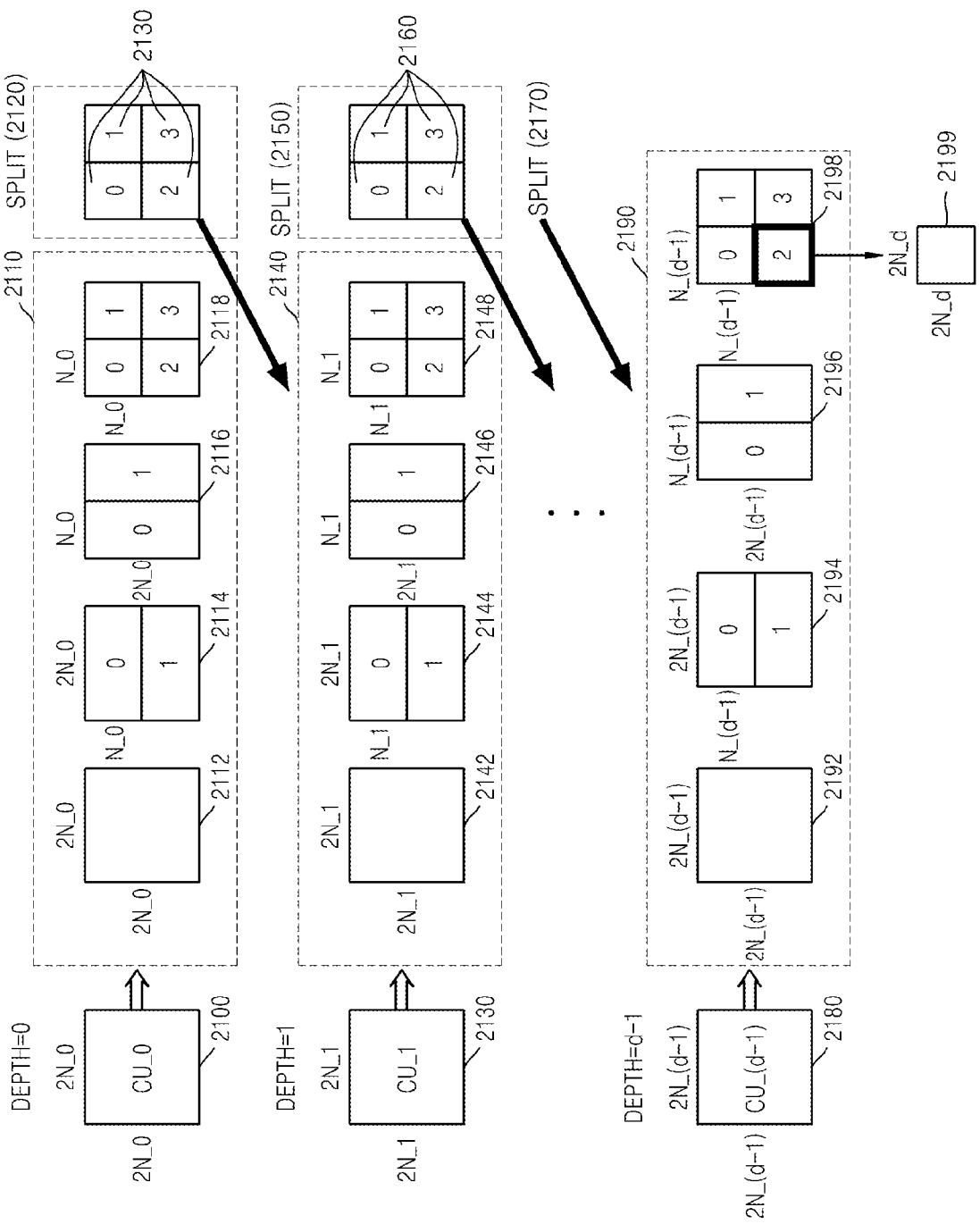
FIG. 21 is a diagram illustrating coding units corresponding to depths, according to an exemplary embodiment.

FIG. 21 is a diagram illustrating coding units corresponding to depths, according to an exemplary embodiment.

Split information may be used to indicate a depth change. The spilt information indicates whether a coding unit of a current depth is split into coding units of a lower depth.

A prediction unit 2110 for prediction-encoding a coding unit 2100 having a depth of 0 and a size of 2N_0×2N_0 may include partitions of a partition type 2112 having a size of 2N_0×2N_0, a partition type 2114 having a size of 2N_0×N_0, a partition type 2116 having a size of N_0×2N_0, and a partition type 2118 having a size of N_0×N_0. Although FIG. 9 illustrates only the partition types 2112 through 2118 which are obtained by symmetrically splitting the prediction unit 2110, a partition type is not limited thereto, and the partitions of the prediction unit 2110 may include asymmetrical partitions, partitions having an arbitrary shape, and partitions having a geometrical shape.

Prediction-encoding is repeatedly performed on one partition having a size of 2N_0×2N_0, two partitions having a size of 2N_0×N_0, two partitions having a size of N_0×2N_0, and four partitions having a size of N_0×N_0, according to each partition type. Prediction-encoding may be performed on the partitions having the sizes of 2N_0×2N_0, N_0×2N_0, 2N_0×N_0, and N_0×N_0, according to an intra mode and an inter mode. Prediction-encoding is performed only on the partition having the size of 2N_0×2N_0, according to a skip mode.

If an encoding error is smallest in one of the partition types 2112 through 2116, the prediction unit 2110 may not be split into a lower depth.

If an encoding error is the smallest in the partition type 2118, a depth is changed from 0 to 1 to split the partition type 2118 in operation 2120, and encoding is repeatedly performed on coding units 2130 having partitions of a depth of 2 and a size of N_0×N_0 to search for a minimum encoding error.

A prediction unit 2140 for prediction-encoding the coding unit 2130 having a depth of 1 and a size of 2N_1×2N_1 (=N_0×N_0) may include partitions of a partition type 2142 having a size of 2N_1×2N_1, a partition type 2144 having a size of 2N_1×N_1, a partition type 2146 having a size of N_1×2N_1, and a partition type 2148 having a size of N_1×N_1.

If an encoding error is the smallest in the partition type 2148 having a size of N_1×N_1, a depth is changed from 1 to 2 to split the partition type 2148 in operation 2150, and encoding is repeatedly performed on coding units 2160 having a depth of 2 and a size of N_2×N_2 so as to search for a minimum encoding error.

When a maximum depth is d, coding units corresponding to depths may be set up to when a depth becomes d−1, and split information may be set up to when a depth is d−2. In other words, when encoding is performed up to when the depth is d−1 after a coding unit corresponding to a depth of d−2 is split in operation 2170, a prediction unit 2190 for prediction-encoding a coding unit 2180 having a depth of d−1 and a size of 2N_(d−1)×2N_(d−1) may include partitions of a partition type 992 having a size of 2N_(d−1)×2N_(d−1), a partition type 2194 having a size of 2N_(d−1)×N_(d−1), a partition type 2196 having a size of N_(d−1)×2N_(d−1), and a partition type 2198 having a size of N_(d−1)×N_(d−1).

Prediction-encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types 2192 through 2198 so as to search for a partition type having a minimum encoding error.

Even when the partition type 2198 has the minimum encoding error, since a maximum depth is d, a coding unit CU_(d−1) having a depth of d−1 is no longer split to a lower depth, and a coded depth for a current maximum coding unit 2100 is determined to be d−1 and a partition type of the coding unit 2100 may be determined to be N_(d−1)×N_(d−1). Also, since the maximum depth is d, split information is not set for a coding unit 952 having a depth of (d−1).

A data unit 2199 may be a 'minimum unit' for the current maximum coding unit 2100. A minimum unit according to an exemplary embodiment may be a rectangular data unit obtained by splitting a minimum unit having a lowest coded depth by 4. By performing encoding repeatedly as described above, the video encoding apparatus 1300 may determine a coded depth by comparing encoding errors according to depths of the coding unit 2100 and selecting a depth having the least encoding error, and set a partition type and a prediction mode for the coding unit 2100 as an encoding mode of the coded depth.

As such, minimum encoding errors according to depths, i.e., the depths of 0, 1, ..., d−1, and d, are compared with one another, and a depth having the least encoding error may be determined as a coded depth. The coded depth, the partition type of the prediction unit, and the prediction mode may be encoded and transmitted as information about an encoding mode. Also, since a coding unit is split from the depth of 0 to the coded depth, only split information of the coded depth is set to 0, and split information of the other depths excluding the coded depth is set to 1.

The image data and encoding information extractor 1420 of the video decoding apparatus 1400 may extract and use the information about the coded depth and the prediction unit of the coding unit 2100 to decode the partition 2112. The video decoding apparatus 1400 may determine a depth corresponding to split information '0', as a coded depth, based on split information according to depths, and may use information an encoding mode about the coded depth during a decoding process.

Figure 22:
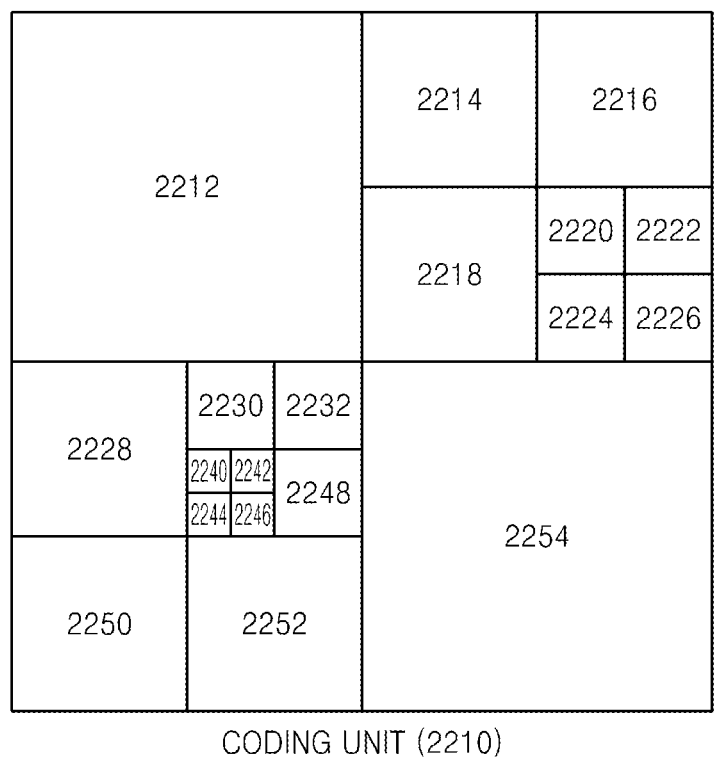
FIGS. 22, 23, and 24 are diagrams illustrating a correlation between coding units, prediction units, and transformation units, according to an exemplary embodiment.
Figure 23:
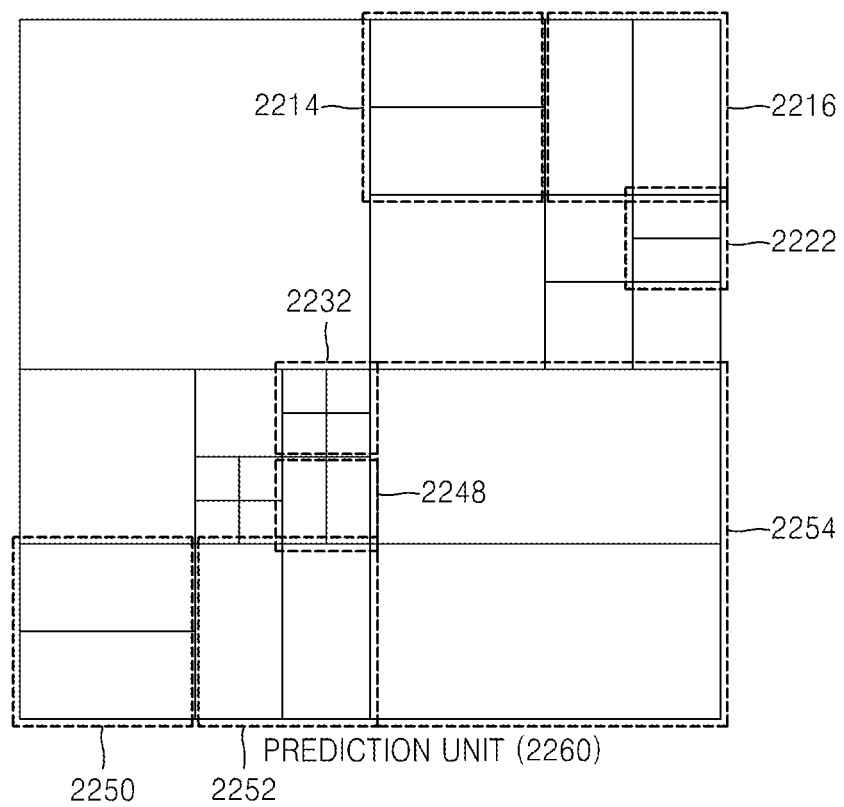
Figure 24:
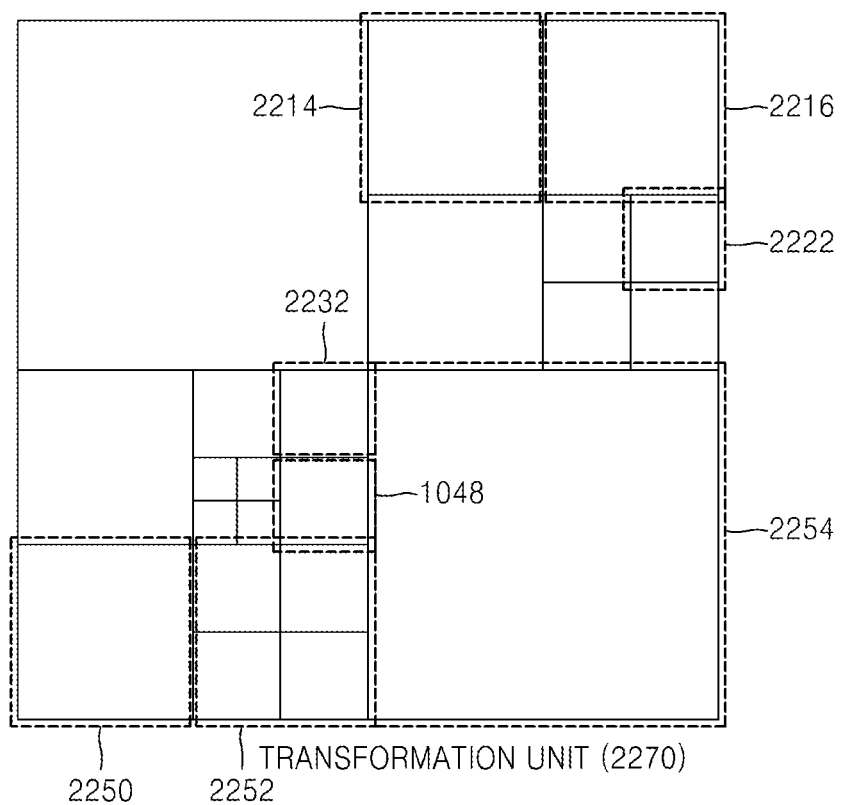

FIGS. 22, 23, and 24 are diagrams illustrating a correlation between coding units 2210, prediction units 2260, and transformation units 2270, according to an exemplary embodiment.

The coding units 2210 are coding units corresponding to coded depths for a maximum coding unit, determined by the video encoding apparatus 1300. The prediction units 2260 are partitions of prediction units of the respective coding units 2210, and the transformation units 2270 are transformation units of the respective coding units 2210.

Among the coding units 2210, if a depth of a maximum coding unit is 0, then coding units 2212 and 2254 have a depth of 1, coding units 2214, 2216, 2218, 2228, 2250, and 2252 have a depth of 2, coding units 2220, 2222, 2224, 2226, 2230, 2232, and 2248 have a depth of 3, and coding units 2240, 2242, 2244, and 2246 have a depth of 4.

Among the prediction units 2260, some partitions 2214, 2216, 2222, 2232, 2248, 2250, 2252, and 2254 are split into partitions split from coding units. In other words, the partitions 2214, 2222, 2250, and 2254 are 2N×N partition types, partitions 2216, 2248, and 2252 are N×2N partition types, and the partition 2232 is a N×N partition type. Prediction units and partitions of the coding units 2210 are smaller than or equal to coding units corresponding thereto.

Among the transformation units 2270, transformation or inverse transformation is performed on image data corresponding to coding unit 2252, based on a data unit that is smaller than the coding unit 2252. Also, transformation units 2214, 2216, 2222, 2232, 2248, 2250, 2252, and 2254 are data units different from corresponding prediction units and partitions among the prediction units 2260, in terms of sizes and shapes. In other words, the video encoding apparatus 1300 and the video decoding apparatus 1400 according to an exemplary embodiment may individually perform intra prediction, motion estimation, motion compensation, transformation, and inverse transformation on the same coding unit, based on different data units Accordingly, an optimum coding unit may be determined by recursively encoding coding units having a hierarchical structure, in units of regions of each maximum coding unit, thereby obtaining coding units having a recursive tree structure. Encoding information may include split information about a coding unit, information about a partition type, information about a prediction mode, and information about a size of a transformation unit. Table 1 shows an example of encoding information that may be set by the video encoding apparatus 1300 and the video decoding apparatus 1400.

The output unit 1330 of the video encoding apparatus 1300 may output the encoding information about the coding units having a tree structure, and the image data and encoding information extractor 1420 of the video decoding apparatus 1400 may extract the encoding information about the coding units having a tree structure from a received bitstream.

Split information indicates whether a current coding unit is split into coding units of a lower depth. If split information of a current depth d is 0, a depth, in which the current coding unit is no longer split into coding units of a lower depth, is a coded depth, and thus information about a partition type, a prediction mode, and a size of a transformation unit may be defined for the coded depth. If the current coding unit is further split according to the split information, encoding is independently performed on four split coding units of a lower depth.

The prediction mode may be one of an intra mode, an inter mode, and a skip mode. The intra mode and the inter mode may be defined for all partition types, and the skip mode is defined only for a 2N×2N partition type.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N to be equal to the size of the current coding unit. If the split information of the transformation unit is 1, transformation units may be obtained by splitting the current coding unit. Also, a size of a transformation unit may be N×N when a partition type of the current coding unit having the size of 2N×2N is a symmetrical partition type, and may be N/2×N/2 when the partition type of the current coding unit is an asymmetrical partition type.

The encoding information about coding units having a tree structure may be assigned to at least one of a coding unit corresponding to a coded depth, a prediction unit, and a

TABLE 1

Split Information 0
(Encoding on Coding Unit having Size of 2N × 2N and Current Depth of d)

| | | | Size of Transformation Unit | | |
| | Partition Type | | Split Information 0 of Transformation Unit | Split Information 1 of Transformation Unit | |
| Prediction Mode | Symmetrical Partition Type | Asymmetrical Partition Type | | | Split Information 1 |
| --- | --- | --- | --- | --- | --- |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 | minimum unit. The coding unit corresponding to the coded depth may include at least one prediction unit and at least one minimum unit that contain the same encoding information.

Accordingly, whether adjacent data units are included in coding units corresponding to the same coded depth may be determined by comparing encoding information of the adjacent data units. Also, a coding unit corresponding to a coded depth may be determined using encoding information of a data unit thereof. Thus, a distribution of coded depths in a maximum coding unit may be determined.

Accordingly, if the current coding unit is predicted based on encoding information of adjacent data units, encoding information of data units in coding units corresponding to depths adjacent to the current coding unit may be directly referred to and used.

Alternatively, if the current coding unit is predicted based adjacent coding units, then adjacent coding units may be referred to by searching data units adjacent to the current coding unit from coding units corresponding to depths, based on encoding information of adjacent coding units corresponding to depths.

Figure 25:
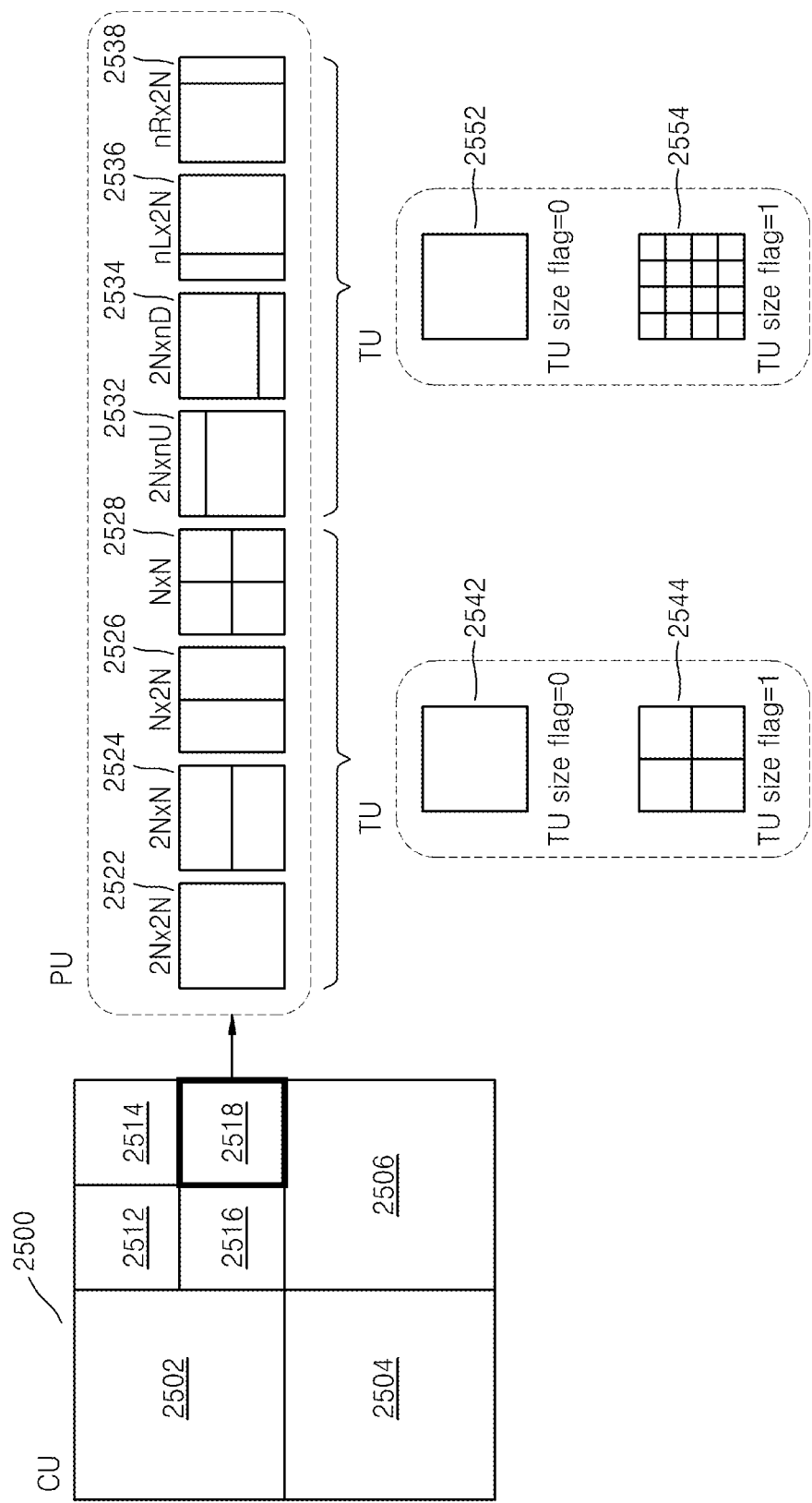
FIG. 25 is a diagram illustrating a correlation between a coding unit, a prediction unit, and a transformation unit, according to encoding mode information of Table 1.

FIG. 25 is a diagram illustrating a correlation between a coding unit, a prediction unit, and a transformation unit, according to encoding mode information of Table 1.

A maximum coding unit 2500 includes coding units 2502, 2504, 2506, 2512, 2514, 2516, and 2518 of coded depths. Here, since the coding unit 2518 is a coding unit of a coded depth, split information thereof may be set to 0. Information about a partition type of the coding unit 2518 having a size of 2N×2N may be set to be one of a partition type 2522 having a size of 2N×2N, a partition type 2524 having a size of 2N×N, a partition type 2526 having a size of N×2N, a partition type 2528 having a size of N×N, a partition type 2532 having a size of 2N×nU, a partition type 2534 having a size of 2N×nD, a partition type 2536 having a size of nL×2N, and a partition type 2538 having a size of nR×2N.

Transformation unit split information, i.e., a Tu size flag, is a type of a transformation index. The size of a transformation unit corresponding to the transformation index may vary according to a prediction unit type or a partition type of a coding unit.

For example, if the partition type is set to be a symmetrical partition type, e.g., the partition type 2522, 2524, 2526, or 2528, then a transformation unit 2542 having a size of 2N×2N is set when the TU size flag is '0', and a transformation unit 2544 having a size of N×N is set when the TU size flag is '1'.

If the partition type is set to be an asymmetrical partition type, e.g., the partition type 2532, 2534, 2536, or 2538, then a transformation unit 2552 having a size of 2N×2N is set when a TU size flag is 0, and a transformation unit 2554 having a size of N/2×N/2 is set when a TU size flag is 1.

By storing a program that executes a method of encoding multi-view video data and a method of decoding multi-view video data according to an exemplary embodiment described above with reference to FIGS. 1 to 25, on a computer readable recording medium, an individual computer system may easily perform these methods.

For convenience of explanation, the method of encoding multi-view video data and the method of decoding multi-view video data described above with reference to FIGS. 1 to 25 will now be referred to as 'video encoding method according to an exemplary embodiment' and 'video decoding method according to an exemplary embodiment', respectively. Also, the multi-view video data encoding apparatus 300 and the multi-view video data decoding apparatus 900 described above with reference to FIGS. 1 to 25 will now be referred to as 'video encoding apparatus according to an exemplary embodiment' and 'video decoding apparatus according to an exemplary embodiment,' respectively.

A computer readable recording medium storing a program, e.g., a disc 260, according to an exemplary embodiment will now be described in detail.

Figure 26A:
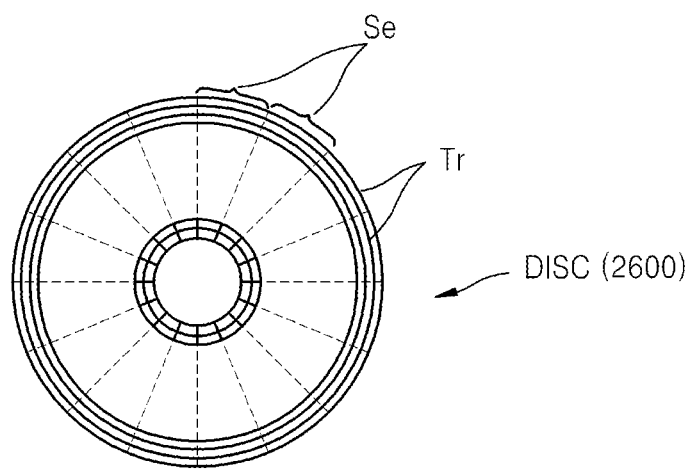
FIG. 26A illustrates a physical structure of a disc that stores a program, according to an exemplary embodiment.

FIG. 26A illustrates a physical structure of a disc 2600 that stores a program, according to an exemplary embodiment. The disc 2600 which is a storage medium may be a hard drive, a compact disc-read only memory (CD-ROM) disc, a Blu-ray disc, or a digital versatile disc (DVD). The disc 2600 includes a plurality of concentric tracks Tf each being divided into a specific number of sectors Se in a circumferential direction of the disc 2600. In a specific region of the disc 2600, a program that executes a method of predicting multi-view video, a method of prediction restoring multi-view video, a method of encoding multi-view video, and a method of decoding multi-view video as described above may be assigned and stored.

A computer system embodied using a storage medium that stores a program for executing a video encoding method and a video decoding method as described above will now be described with reference to FIG. 26B.

Figure 26B:
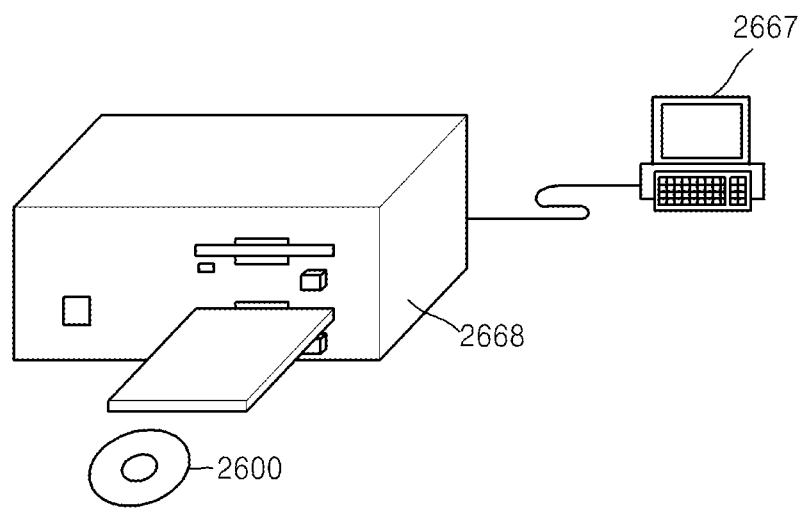
FIG. 26B illustrates a disc drive that records and reads a program by using a disc.

FIG. 26B illustrates a disc drive 2668 that records and reads a program by using a disc 2600. A computer system 2667 may store a program that executes at least one of a video encoding method and a video decoding method according to an exemplary embodiment, in a disc 2600 via the disc drive 2668. To run the program stored in the disc 2600 in the computer system 2667, the program may be read from the disc 2600 and be transmitted to the program to the computer system 2667 by using the disc drive 2668.

The program that executes at least one of a video encoding method and a video decoding method according to an exemplary embodiment may be stored not only in the disc 2600 illustrated in FIG. 26A or 26B but also in a memory card, a ROM cassette, or a solid state drive (SSD).

A system to which the video encoding method and a video decoding method described above are applied will be described below.

Figure 27:
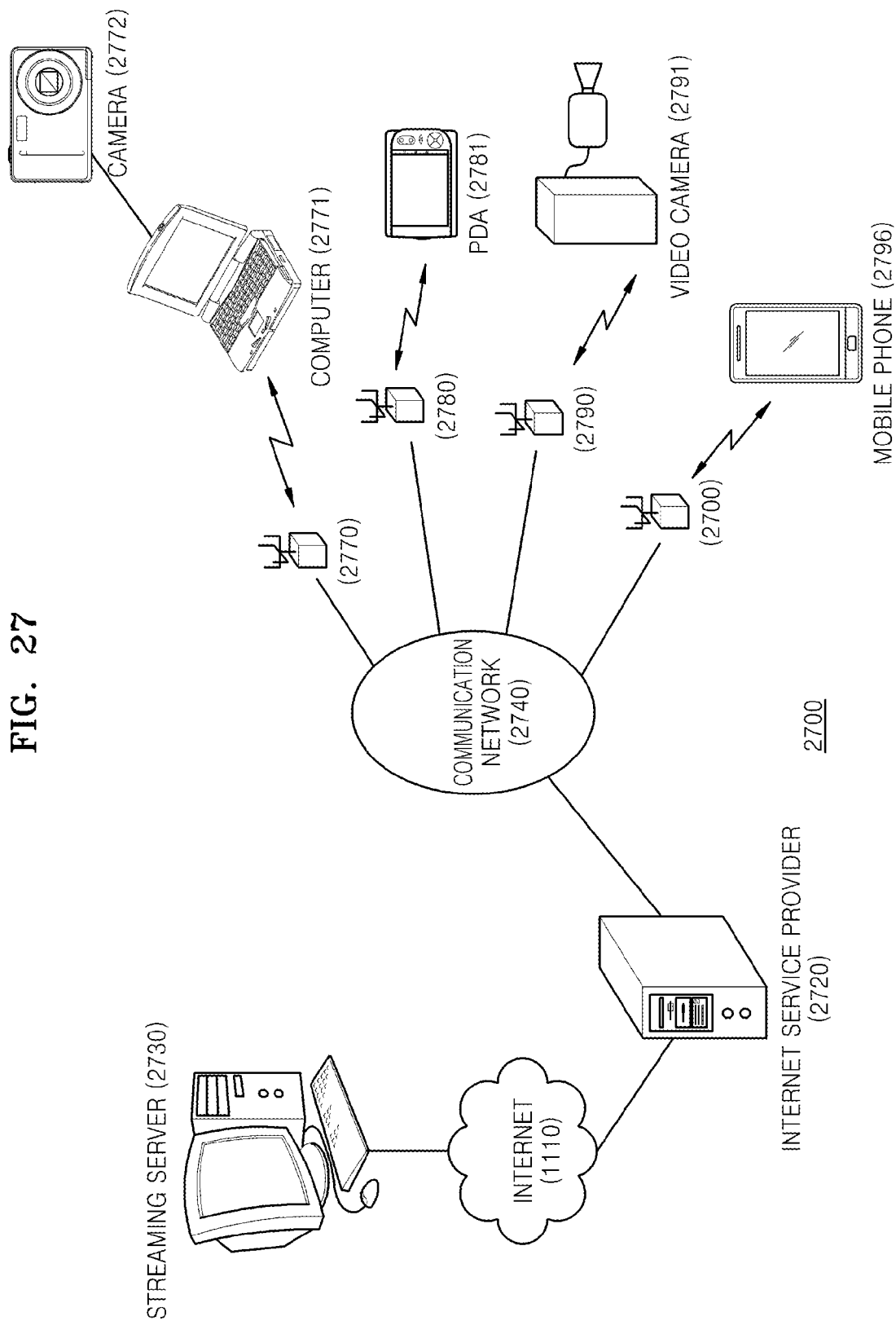
FIG. 27 illustrates an entire structure of a content supply system that provides content distribution service.

FIG. 27 illustrates an entire structure of a content supply system 2700 that provides content distribution service. A service area of a communication system is divided into predetermined-sized cells, and wireless base stations 2770, 2780, 2790, and 2700 are installed in these cells, respectively.

The content supply system 2700 includes a plurality of independent devices. For example, the plurality of independent devices, such as a computer 2771, a personal digital assistant (PDA) 2781, a video camera 2791, and a mobile phone 2796, are connected to the Internet 2710 via an internet service provider 2720, a communication network 2740, and the wireless base stations 2770, 2780, 2790, and 2795.

However, the content supply system 2700 is not limited to as illustrated in FIG. 26, and devices may be selectively connected thereto. The plurality of independent devices may be directly connected to the communication network 2740, not via the wireless base stations 2770, 2780, 2790, and 2795.

The video camera 2791 is an imaging device, e.g., a digital video camera, which is capable of capturing video images. The mobile phone 2796 may employ at least one communication method from among various protocols, e.g., Personal Digital Communications (PDC), code division multiple access (CDMA), wideband-code division multiple access (W-CDMA), the Global System for Mobile Communications (GSM), and the Personal Handyphone System (PHS).

The video camera 2791 may be connected to a streaming server 2730 via the wireless base station 2790 and the communication network 2740. The streaming server 2730 allows content received from a user via the video camera 2791 to be streaming-transmitted via a real-time broadcast. The content received from the video camera 2791 may be encoded using the video camera 2791 or the streaming server 2730. Video data captured by the video camera 2791 may be transmitted to the streaming server 2730 via the computer 2771.

Video data captured by a camera 2791 may also be transmitted to the streaming server 2730 via the computer 2771. The camera 2772 is an imaging device capable of capturing both still images and video images, similar to a digital camera. The video data captured by the camera 2772 may be encoded using the camera 2772 or the computer 2771. Software that performs encoding and decoding video may be stored in a computer readable recording medium, e.g., a CD-ROM disc, a floppy disc, a hard disc drive, an SSD, or a memory card, which may be accessible by the computer 2771.

If video data is captured by a camera built in the mobile phone 2796, the video data may be received from the mobile phone 2796.

The video data may also be encoded by a large scale integrated circuit (LSI) system installed in the video camera 2791, the mobile phone 2796, or the camera 2772.

According to an exemplary embodiment, the content supply system 2700 may encode content data recorded by a user using the video camera 2791, the camera 2772, the mobile phone 2796, or another imaging device, e.g., content recorded during a concert, and transmit the encoded content data to the streaming server 2730. The streaming server 2730 may streaming-transmit the encoded content data to other clients that request the content data.

The clients are devices capable of decoding the encoded content data, e.g., the computer 2771, the PDA 1220, the video camera 2791, or the mobile phone 2796. Thus, the content supply system 2700 allows the clients to receive and reproduce the encoded content data. Also, the content supply system 2700 allows the clients to receive the encoded content data and decode and reproduce the encoded content data in real time, thereby enabling personal broadcasting.

Encoding and decoding operations of the plurality of independent devices included in the content supply system 2700 may be similar to those of a video encoding apparatus and a video decoding apparatus according to an exemplary embodiment.

The mobile phone 2796 included in the content supply system 2700 according to an exemplary embodiment will now be described in more detail with reference to FIGS. 28 and 29.

Figure 28:
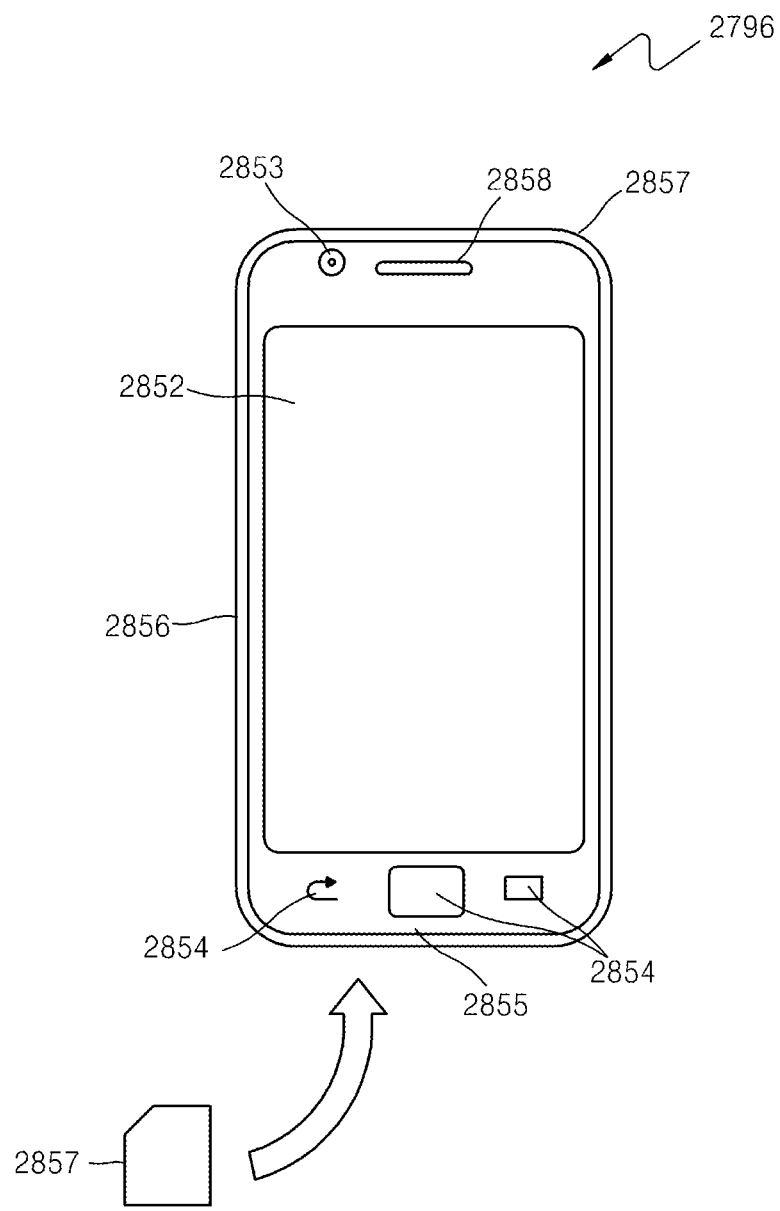
FIGS. 28 and 29 illustrate external and internal structures of a mobile phone to which a video encoding method and a video decoding method are applied, according to an exemplary embodiment.

FIG. 28 illustrates an external structure of a mobile phone 2796 to which a video encoding method and a video decoding method are applied, according to an exemplary embodiment. The mobile phone 2796 may be a smart phone, the functions of which are not limited and a large part of the functions of which may be changed or expanded.

The mobile phone 2796 includes an internal antenna 2851 via which a radio-frequency (RF) signal may be exchanged with the wireless base station 2795 of FIG. 27, and includes a display screen 2852 for displaying images captured by a camera 2853 or images that are received via the antenna 2851 and decoded, e.g., a liquid crystal display (LCD) or an organic light-emitting diodes (OLED) screen. The smart phone 2796 includes an operation panel 2854 including a control button and a touch panel. If the display screen 2852 is a touch screen, the operation panel 2854 further includes a touch sensing panel of the display screen 2852. The smart phone 2796 includes a speaker 2858 for outputting voice and sound or another type sound output unit, and a microphone 2855 for inputting voice and sound or another type sound input unit.

The smart phone 2796 further includes the camera 2853, such as a charge-coupled device (CCD) camera, to capture video and still images. The smart phone 2796 may further include a storage medium 2857 for storing encoded/decoded data, e.g., video or still images captured by the camera 2853, received via email, or obtained according to another method; and a slot 2856 via which the storage medium 2857 is loaded into the mobile phone 1250. The storage medium 2857 may be a flash memory, e.g., a secure digital (SD) card or an electrically erasable and programmable read only memory (EEPROM) included in a plastic case.

Figure 29:
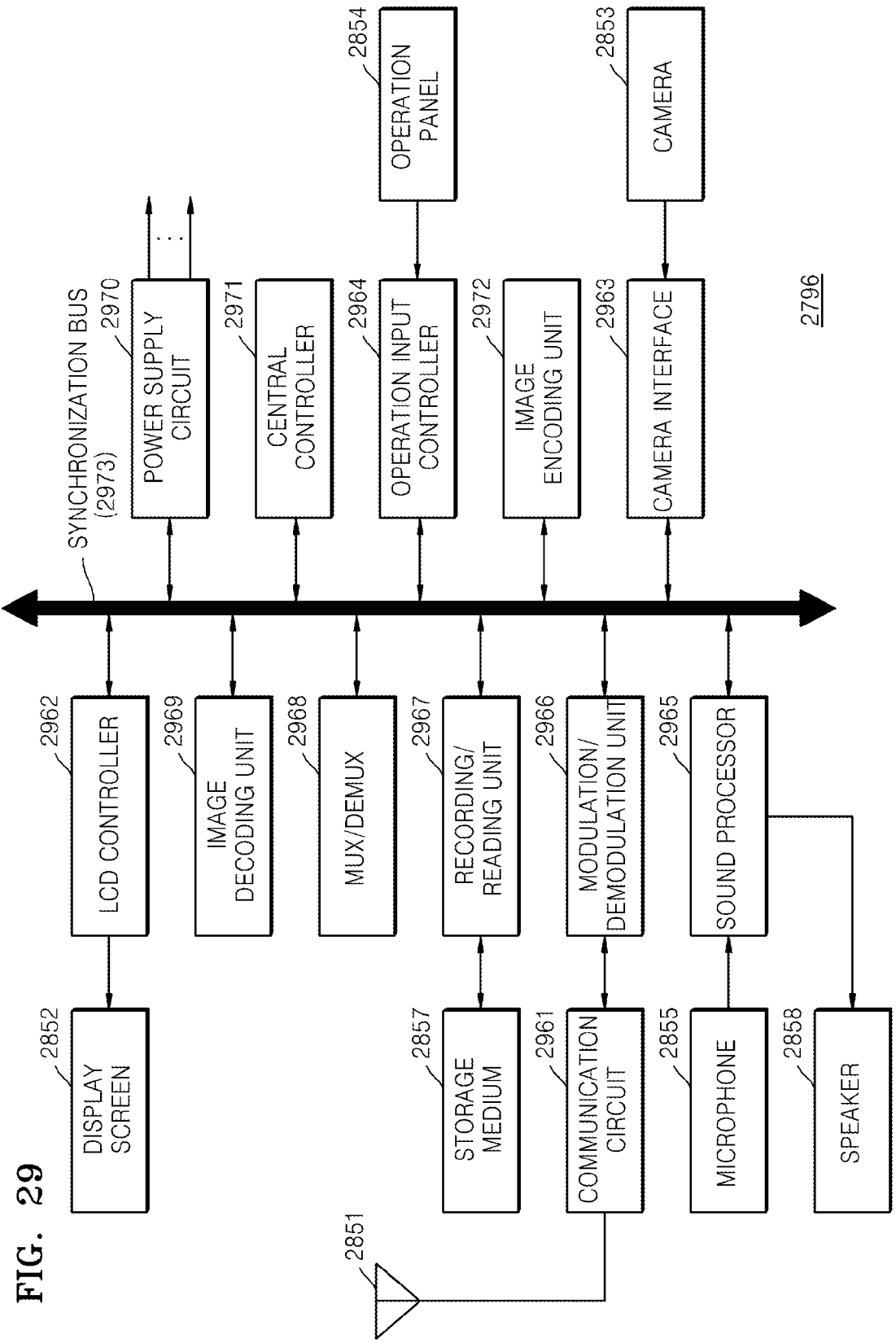

FIG. 29 illustrates an internal structure of the mobile phone 2796, according to an exemplary embodiment. To systemically control parts of the mobile phone 2796 including the display screen 2852 and the operation panel 2854, a power supply circuit 2970, an operation input controller 2964, an image encoding unit 2972 (e.g., an image encoder), a camera interface 2963, an LCD controller 2962, an image decoding unit 2669 (e.g., an image decoder), a multiplexer/demultiplexer 2968, a recording/reading unit 2967 (e.g., a recorder/reader), a modulation/demodulation unit 2966 (e.g., a modulator/demodulator), and a sound processor 2965 are connected to a central controller 2971 via a synchronization bus 2973.

If a user operates a power button and sets from a 'power off' state to a power on' state, the power supply circuit 2970 supplies power to all the parts of the mobile phone 2796 from a battery pack, thereby setting the mobile phone 2796 in an operation mode.

The central controller 2971 includes a central processing unit (CPU), a ROM, and a random access memory (RAM).

While the mobile phone 2796 transmits communication data to the outside, a digital signal is generated in the mobile phone 2796 under control of the central controller. For example, the sound processor 2965 may generate a digital sound signal, the image encoding unit 2972 may generate a digital image signal, and text data of a message may be generated via the operation panel 2854 and the operation input controller 2964. When a digital signal is delivered to the modulation/demodulation unit 2966 under control of the central controller 2971, the modulation/demodulation unit 2966 modules a frequency band of the digital signal, and a communication circuit 2961 performs digital-to-analog conversion (DAC) and frequency conversion on the frequency band-modulated digital signal. A transmission signal output from the communication circuit 2961 may be transmitted to a voice communication base station or the wireless base station 2795 via the antenna 2851.

For example, when the mobile phone 2796 is in a conversation mode, a sound signal obtained via the microphone 2855 is transformed into a digital sound signal by the sound processor 2965, under control of the central controller 2971. The digital sound signal may be transformed into a transformation signal via the modulation/demodulation unit 2966 and the communication circuit 2961, and may be transmitted via the antenna 2951.

When a text message, e.g., email, is transmitted in a data communication mode, text data of the text message is input via the operation panel 2854 and is transmitted to the central controller 2961 via the operation input controller 2964. Under control of the central controller 2961, the text data is transformed into a transmission signal via the modulation/demodulation unit 2966 and the communication circuit 2961 and is transmitted to the wireless base station 2795 via the antenna 2851.

To transmit image data in the data communication mode, image data captured by the camera 2853 is provided to the image encoding unit 2972 via the camera interface 2963. The captured image data may be directly displayed on the display screen 2852 via the camera interface 2963 and the LCD controller 2962.

A structure of the image encoding unit 2972 may correspond to that of the video encoding apparatus 1300 described above. The image encoding unit 2972 may transform the image data received from the camera 2853 into compressively encoded image data according to a video encoding method employed by the video encoding apparatus 1300 or the image encoder 1600 described above, and then output the encoded image data to the multiplexer/demultiplexer 2968. During a recording operation of the camera 2853, a sound signal obtained by the microphone 2855 of the mobile phone 2796 may be transformed into digital sound data via the sound processor 2965, and the digital sound data may be delivered to the multiplexer/demultiplexer 2968.

The multiplexer/demultiplexer 2968 multiplexes the encoded image data received from the image encoding unit 2972, together with the sound data received from the sound processor 2965. A result of multiplexing the data may be transformed into a transmission signal via the modulation/demodulation unit 2966 and the communication circuit 2961, and may then be transmitted via the antenna 2851.

While the mobile phone 2796 receives communication data from the outside, frequency recovery and ADC are performed on a signal received via the antenna 2851 to transform the signal into a digital signal. The modulation/demodulation unit 2966 modulates a frequency band of the digital signal. The frequency-band modulated digital signal is transmitted to the video decoding unit 2969, the sound processor 2965, or the LCD controller 2962, according to the type of the digital signal.

In the conversation mode, the mobile phone 2796 amplifies a signal received via the antenna 2851, and obtains a digital sound signal by performing frequency conversion and ADC on the amplified signal. A received digital sound signal is transformed into an analog sound signal via the modulation/demodulation unit 2966 and the sound processor 2965, and the analog sound signal is output via the speaker 2858, under control of the central controller 2971.

When in the data communication mode, data of a video file accessed at an Internet website is received, a signal received from wireless base station 2795 via the antenna 2851 is output as multiplexed data via the modulation/demodulation unit 2966, and the multiplexed data is transmitted to the multiplexer/demultiplexer 2968.

To decode the multiplexed data received via the antenna 2851, the multiplexer/demultiplexer 2968 demultiplexes the multiplexed data into an encoded video data stream and an encoded audio data stream. Via the synchronization bus 2973, the encoded video data stream and the encoded audio data stream are provided to the video decoding unit 2969 and the sound processor 2965, respectively.

A structure of the image decoding unit 2969 may correspond to that of the video decoding apparatus 1400 described above. The image decoding unit 2969 may decode the encoded video data to obtain restored video data and provide the restored video data to the display screen 2952 via the LCD controller 2962, according to a video decoding method employed by the video decoding apparatus 1400 or the image decoder 1700 described above.

Thus, the data of the video file accessed at the Internet website may be displayed on the display screen 2852. At the same time, the sound processor 2965 may transform audio data into an analog sound signal, and provide the analog sound signal to the speaker 2858. Thus, audio data contained in the video file accessed at the Internet website may also be reproduced via the speaker 2858.

The mobile phone 2796 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 30:
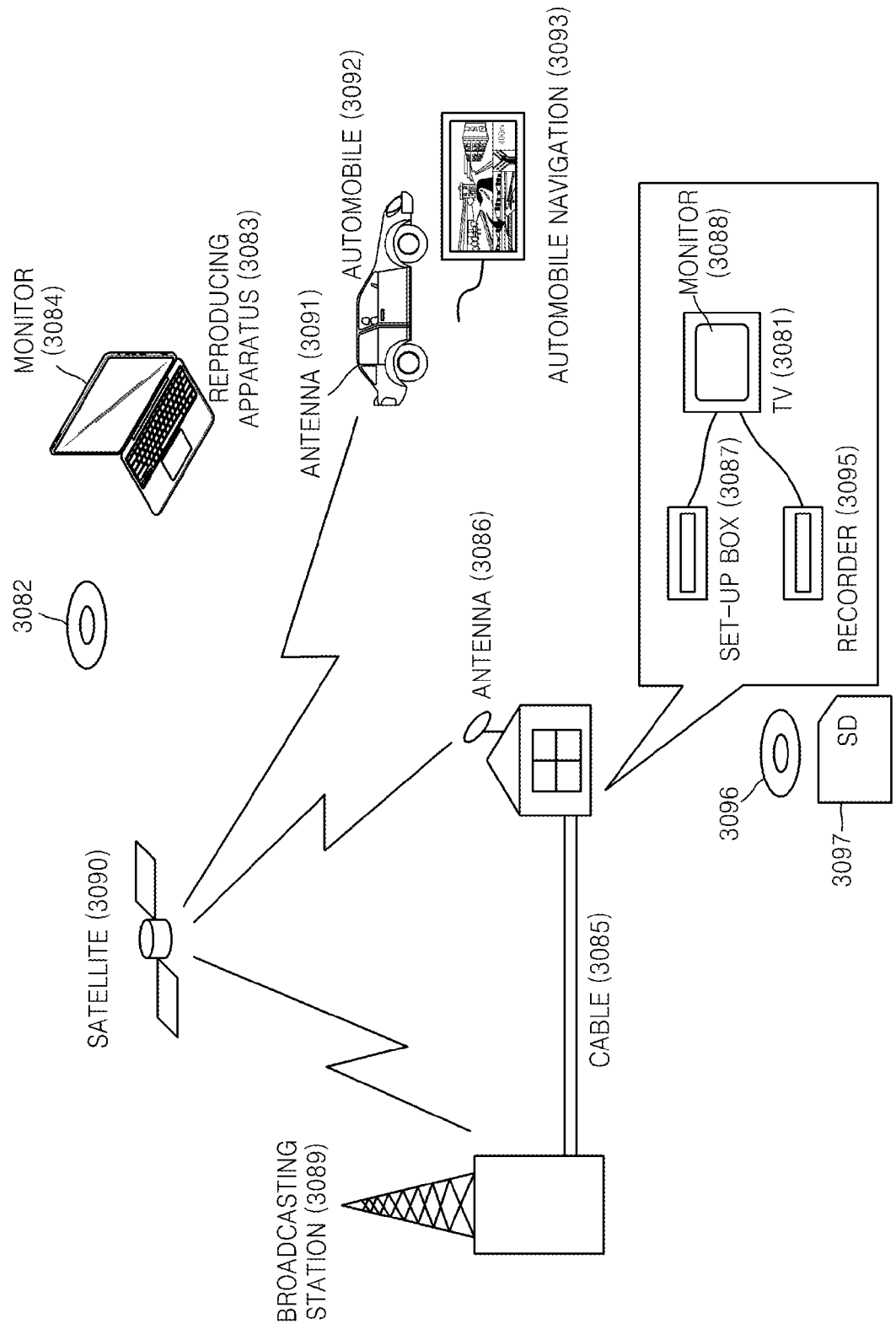
FIG. 30 illustrates a digital broadcasting system employing a communication system, according to an exemplary embodiment.

A communication system according to an exemplary embodiment is not limited to the communication system described above with reference to FIG. 27. For example, FIG. 30 illustrates a digital broadcasting system employing a communication system, according to an exemplary embodiment. The digital broadcasting system of FIG. 30 may receive a digital broadcast transmitted via a satellite or a terrestrial network by using a video encoding apparatus and a video decoding apparatus according to an exemplary embodiment.

Specifically, a broadcasting station 3089 transmits a video data stream to a communication satellite or a broadcasting satellite 3090 by using electronic waves. The broadcasting satellite 3090 transmits a broadcast signal, and the broadcast signal is transmitted to a satellite broadcast receiver via a household antenna 3086. In every house, an encoded video stream may be decoded and reproduced by a TV receiver 3081, a set-top box 3087, or another device.

When a video decoding apparatus according to an exemplary embodiment is included in a reproducing apparatus 3083, the reproducing apparatus 3083 may parse and decode an encoded video stream recorded on a storage medium 3082, such as a disc or a memory card to restore the original video signal. Thus, the restored video signal may be reproduced, for example, on a monitor 3084.

In the antenna 3086 for a satellite/terrestrial broadcast or the set-top box 3087 connected to a cable antenna 3085 for receiving a cable television (TV) programs, a video decoding apparatus according to an exemplary embodiment may be installed. Data output from the set-top box 3087 may also be reproduced on a TV monitor 3088.

As another example, a video decoding apparatus according to an exemplary embodiment may be installed in the TV receiver 3081 instead of the set-top box 3087.

An automobile 3092 including an appropriate antenna 3091 may receive a signal transmitted from the satellite 3090 or the wireless base station 2770 of FIG. 26. A decoded video may be reproduced on a display screen of an automobile navigation system 3093 built in the automobile 3092.

A video signal may be encoded by a video encoding apparatus according to an exemplary embodiment and may then be stored in a storage medium. Specifically, an image signal may be stored in a DVD disc 3096 by a DVD recorder or may be stored in a hard disc by a hard disc recorder 3095. As another example, the video signal may be stored in an SD card 3097. If the hard disc recorder 3095 includes a video decoding apparatus according to an exemplary embodiment, a video signal recorded on the DVD disc 3096, the SD card 3097, or another storage medium may be reproduced on the TV monitor 3088.

The automobile navigation system 3093 may not include the camera 2853, the camera interface 2963, and the image encoding unit 2972 of FIG. 29. For example, the computer 2771 and the TV receiver 3081 may not be included in the camera 2853, the camera interface 2963, and the image encoding unit 2972 of FIG. 29.

Figure 31:
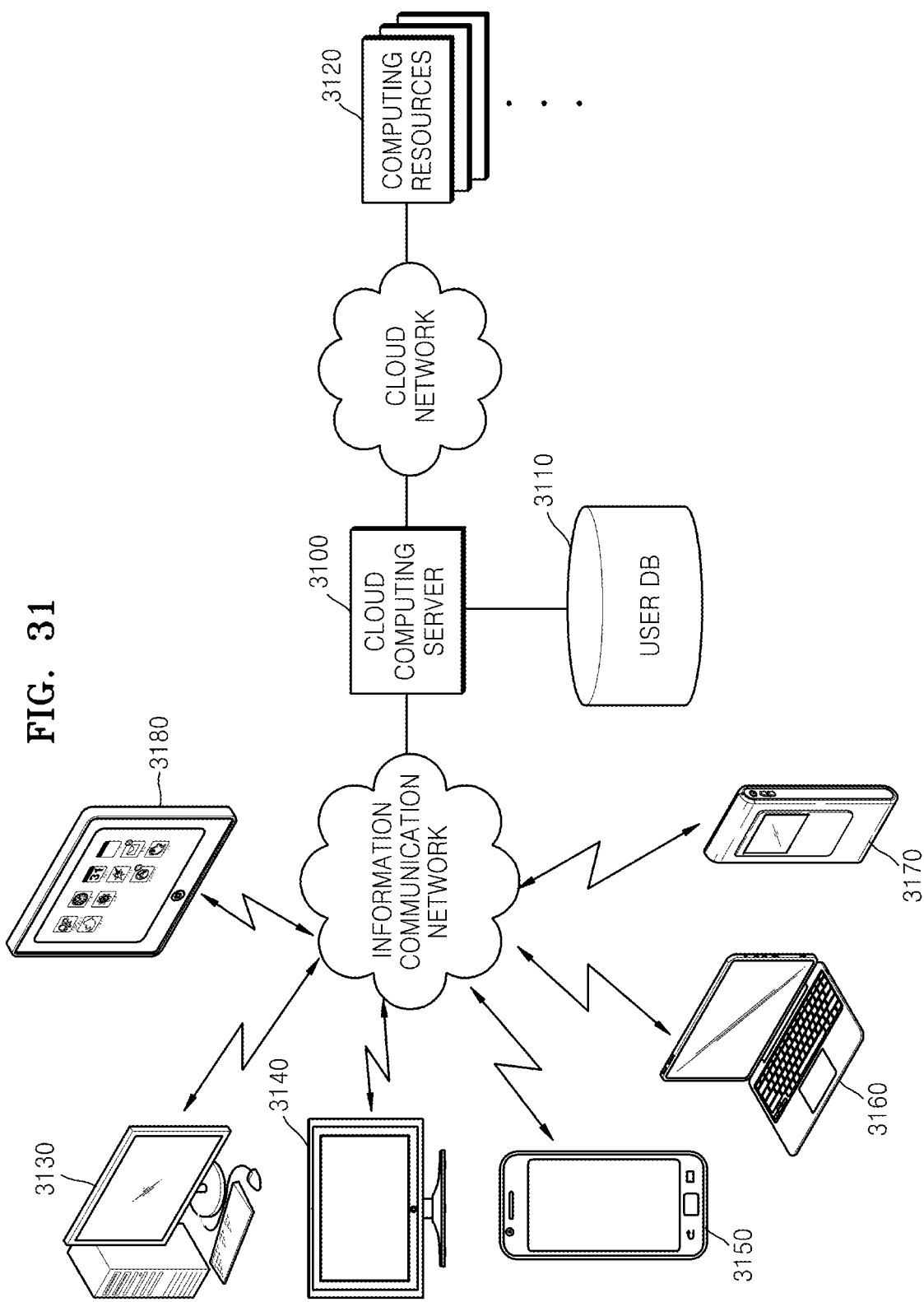
FIG. 31 illustrates a network structure of a cloud computing system using a video encoding apparatus and a video decoding apparatus, according to an exemplary embodiment.

FIG. 31 illustrates a network structure of a cloud computing system using a video encoding apparatus and a video decoding apparatus, according to an exemplary embodiment.

The cloud computing system may include a cloud computing server 3100, a user database (DB) 3110, a plurality of computing resources 3120, and a user terminal.

The cloud computing system provides an on-demand outsourcing service of the plurality of computing resources 3120 via an information communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point of time.

A user terminal of a specified service user is connected to the cloud computing server 3110 via an information communication network including the Internet and a mobile telecommunication network. User terminals may be provided cloud computing services, and particularly motion picture reproduction services, from the cloud computing server 3110. The user terminals may be various types of electronic devices capable of being connected to the Internet, e.g., a desk-top PC 3130, a smart TV 3140, a smart phone 3150, a notebook computer 3160, a portable multimedia player (PMP) 3170, a tablet PC 3180, and the like.

The cloud computing server 3110 may combine the plurality of computing resources 3120 distributed in a cloud network and provide user terminals with a result of the combining. The plurality of computing resources 3120 may include various data services, and may include data uploaded from user terminals. As described above, the cloud computing server 3110 may provide user terminals with desired services by combining motion picture database distributed in different regions according to the virtualization technology.

User information about users who has subscribed to a cloud computing service is stored in the user DB 3110. The user information may include logging information, addresses, names, and personal credit information of the users. The user information may further include indexes of motion pictures. Here, the indexes may include a list of motion pictures that have already been reproduced, a list of motion pictures that are being reproduced, a pausing point of a motion picture that was being reproduced, and the like.

Information about a motion picture stored in the user DB 3110 may be shared between user devices. For example, when a motion picture service is provided to the notebook computer 3160 in response to a request from the notebook computer 1460, a reproduction history of the motion picture service is stored in the user DB 3110. When a request to reproduce this motion picture service is received from the smart phone 3150, the cloud computing server 3110 searches for and reproduces this motion picture service, based on the user DB 1410. When the smart phone 3150 receives a motion picture data stream from the cloud computing server 3110, a process of reproducing video by decoding the motion picture data stream is similar to an operation of the mobile phone 3150 described above with reference to FIG. 29.

The cloud computing server 3110 may refer to a reproduction history of a desired motion picture service, stored in the user DB 3110. For example, the cloud computing server 3110 receives a request to reproduce a motion picture stored in the user DB 3110, from a user terminal. If this motion picture was being reproduced, then a method of streaming this motion picture, performed by the cloud computing server 3110 may vary according to the request from the user terminal, i.e., according to whether the motion picture will be reproduced, starting from a start thereof or a pausing point thereof. For example, if the user terminal requests to reproduce the motion picture, starting from the start thereof, the cloud computing server 3110 streaming-transmits the motion picture starting from a first frame thereof to the user terminal. If the user terminal requests to reproduce the motion picture, starting from the pausing point thereof, the cloud computing server 3110 streaming-transmits the motion picture starting from a frame corresponding to the pausing point, to the user terminal.

In this case, the user terminal may include a video decoding apparatus as described above with reference to FIGS. 1 to 25. As another example, the user terminal may include a video encoding apparatus as described above with reference to FIGS. 1 to 25. Alternatively, the user terminal may include both the video decoding apparatus and the video encoding apparatus as described above with reference to FIGS. 1 to 25.

Various applications of a video encoding method, a video decoding method, a video encoding apparatus, and a video decoding apparatus according to various exemplary embodiments described above with reference to FIGS. 1 to 25 have been described above with reference to FIGS. 26A to 31. However, methods of storing the video encoding method and the video decoding method in a storage medium or methods of including the video encoding apparatus and the video decoding apparatus in a device according to various exemplary embodiments, are not limited to the embodiments described above with reference to FIGS. 26A to 31.

One of ordinary skill in the art would understand the block diagrams disclosed in the present disclosure as conceptual diagrams of circuits for realizing the principles of the inventive concept. Similarly, it would be apparent to those of ordinary skill in the art that arbitrary flow charts, flow diagrams, state transition diagram, pseudo code, and the like denote various processes that may be substantially stored in a computer readable recording medium and that may be performed by a computer or a processor, regardless of whether the computer or the processor are explicitly illustrated or not. Thus, the exemplary embodiments described above may be embodied as a computer program. The computer program may be stored in a computer readable recording medium, and executed using a general digital computer. Examples of the computer readable medium are a magnetic recording medium (a ROM, a floppy disc, a hard disc, etc.), and an optical recording medium (a CD-ROM, a DVD, etc.).

The functions of various elements illustrated in the drawings may be related to appropriate software, and be provided via not only hardware capable of executing the software but also exclusive hardware. These functions may also be provided via a single exclusive processor, a single shared processor, or a plurality of individual processors, some of which may be shared. Also, explicit use of the term 'processor' or 'controller' is not limited to exclusively using hardware capable of executing software, and may implicitly include a digital signal processor (DSP) hardware, and a read-only memory (ROM), a random access memory (RAM), or a nonvolatile storage medium for storing software.

In the claims of the present specification, an element suggested as means for performing a specific operation cover any of arbitrary methods of performing the specific operation. Example of this element may include a combination of circuit elements capable of performing the specific operation, or software having an arbitrary form, e.g., firmware or microcode, which is combined with an appropriate circuit for executing software for performing the specific operation.

In the present disclosure, the expression 'an embodiment' of the principles of the inventive concept and various medications to this expression mean that specific features, structure, and characteristics related to this exemplary embodiment are included in at least one exemplary embodiment of the principles of the inventive concept. Thus, the expression 'an embodiment' and arbitrary other modifications thereof disclosed in the present disclosure do not always indicate the same embodiment.

In the present disclosure, the expression 'at least one of' of 'at least one of A and B' is used to inclusively mean that only the first option (A) is selected, only the second option (B) is selected, or both the first and second operations (A and B) are selected. In addition, the expression 'at least one of A, B, and C' is used to inclusively mean that only the first option (A) is selected, only the second option (B) is selected, only the third option (C) is selected, only the first and second options (A and B) are selected, only the second and third options (B and C) are selected, only the first and third (A and C) are selected or all the three options (A, B, and C) are selected. When more than three items are listed related to this expression, it would be apparent to those of ordinary skill in the art.

While the exemplary embodiments have been particularly shown and described with reference to the drawings, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description but by the appended claims, and all differences within the scope will be construed as being included in the inventive concept.

The invention claimed is:

1. A method of encoding a depth map of multi-view video data, the method comprising:
   obtaining a multi-view color video frame and a depth map frame corresponding to the multi-view color video frame;
   prediction-encoding and restoring the obtained multi-view color video frame;
   splitting a block of the restored multi-view color video frame into at least one partition based on a pixel value of the block of the restored multi-view color video frame;
   obtaining a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the restored multi-view color video frame; and
   obtaining prediction values of the corresponding block partitions of the depth map frame from the block partitions of the restored multi-view color video frame by using the obtained parameter.

2. The method of claim 1, wherein the prediction-encoding of the multi-view color video frame comprises:
   determining coding units having a tree structure including coding units of a coded depth from among hierarchical coding units corresponding to depths, for each of at least one maximum coding unit that is split from the multi-view color video frame;
   determining partitions for prediction-encoding each of the coding units corresponding to the coded depth; and
   determining transformation units having a tree structure by performing transformation based on hierarchical transformation units,
   wherein the depths each denote a number of times the at least one maximum coding unit is spatially split.

3. The method of claim 1, wherein the obtaining of the parameter comprises determining the parameter so that differences between the peripheral pixel values of the block partitions of the depth map frame obtained from the peripheral pixel values of the block partitions of the multi-view color video frame and original peripheral pixel values of the block partitions of the depth map frame are minimized by using the correlation.

4. The method of claim 3, wherein the correlation is a linear relationship, and the parameter comprises a weight and an offset value defining the linear relationship between the peripheral pixel values of the block partitions of the multi-view color video frame and the corresponding peripheral pixel values of the block partitions of the depth map frame.

5. The method of claim 4, wherein, if the peripheral pixel values of the block partitions of the multi-view color video frame is Rec_Y', prediction values of the corresponding peripheral pixel values of the block partitions of the depth map frame is Pred_D, the weight is a, and the offset value is b, the correlation is defined as an equation: Pred_D=a*Rec_Y'+b.

6. The method of claim 1, wherein the obtaining prediction values of the corresponding block partitions of the depth map frame comprises:
   obtaining the prediction values of the corresponding block partitions of the depth map frame by using block partitions of a restored multi-view color video frame having different color components; and
   comparing costs of the prediction values obtained from the block partitions of the restored multi-view color video frame having different color components and determining block partitions of a multi-view color video frame to be used to predict the block partitions of the depth map frame.

7. An apparatus for encoding a depth map of multi-view video data, the apparatus comprising:
   an image obtainer which is configured to obtain a multi-view color video frame and a depth map frame corresponding to the multi-view color video frame;
   a color video frame encoder which is configured to prediction-encode the obtained multi-view color video frame;
   a restorer which is configured to restore the encoded color video frame;
   a splitter which is configured to split a block of the restored multi-view color video frame into at least one partition based on a pixel value of the block of the restored multi-view color video frame;
   a correlation parameter obtainer which is configured to obtain a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the restored multi-view color video frame; and
   a depth map frame predictor which is configured to obtain prediction values of the corresponding block partitions of the depth map frame from the block partitions of the restored multi-view color video frame by using the obtained parameter.

8. A method of decoding a depth map of multi-view video data, the method comprising:
- receiving a bitstream obtained by encoding a multi-view color video frame and a depth map frame corresponding to the multi-view color video frame;
- decoding the multi-view color video frame;
  - splitting a block of the decoded multi-view color video frame into at least one partition based on a pixel value of the block of the decoded multi-view color video frame;
- obtaining a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the decoded multi-view color video frame; and
  - obtaining prediction values of the corresponding block partitions of the depth map frame from the block partitions of the decoded multi-view color video frame by using the obtained parameter.

9. The method of claim 8, wherein the decoding of the multi-view color video frame comprises:
- obtaining information about a size of each of at least one maximum coding unit that is split from the multi-view color video frame, a depth denoting a number of times the at least one maximum coding unit is spatially split, partitions used to prediction-encode coding units hierarchically configured according to the depth, and transformation units having a hierarchical structure, from the bitstream;
- determining coding units having a tree structure including coding units corresponding to a coded depth from among hierarchical coding units corresponding to depths, for each of the at least one maximum coding unit that is split from the multi-view color video frame;
- determining partitions for prediction-decoding each of the coding units corresponding to the coded depth; and
- determining transformation units having a tree structure, based on the obtained information,
- wherein the depths each denote the number of times the at least one maximum coding unit is spatially split.

10. The method of claim 8, wherein the obtaining of the parameter comprises: determining the parameter so that differences between the peripheral pixel values of the block partitions of the depth map frame obtained from the peripheral pixel values of the block partitions of the multi-view color video frame and original peripheral pixel values of the block partitions of the depth map frame are minimized by using the correlation.

11. The method of claim 10, wherein the correlation is a linear relationship, and the parameter comprises a weight and an offset value defining the linear relationship between the peripheral pixel values of the block partitions of the multi-view color video frame and the corresponding peripheral pixel values of the block partitions of the depth map frame.

12. The method of claim 11, wherein, if the peripheral pixel values of the block partitions of the multi-view color video frame is Rec_Y', prediction values of the corresponding peripheral pixel values of the block partitions of the depth map frame is Pred_D, the weight is a, and the offset value is b, the correlation is defined as an equation:

$$Pred\_D = a * Rec\_Y' + b.$$

13. The method of claim 8, wherein the obtaining prediction values of the corresponding block partitions of the depth map frame comprises:
- obtaining the prediction values of the corresponding block partitions of the depth map frame by using block partitions of a restored multi-view color video frame having different color components; and
- comparing costs of the prediction values obtained from the block partitions of the restored multi-view color video frame having different color components and determining block partitions of a multi-view color video frame to be used to predict the block partitions of the depth map frame.

14. The method of claim 8, wherein the block of the multi-view color video frame is one of a color video frame block having a same view as the depth map frame block, a color video frame block having a same view scaled to have a same size as that of the depth map frame block, peripheral blocks of a color video frame block having a same view as that of the depth map frame block, peripheral blocks of the color video frame block having a same view scaled to have a same size as that of the depth map frame block, a color video frame block having a different view from that of the depth map frame block determined based on a disparity vector indicating a difference between views of multi-view video, a color video frame block having a different view scaled to have a same size as that of the depth map frame block and determined based on the disparity vector, peripheral blocks of the color video frame block having a different view from that of the depth map frame block determined based on the disparity vector, and peripheral blocks of the color video frame block having a different view scaled to have a same size as that of the depth map frame block and determined based on the disparity vector.

15. An apparatus for decoding a depth map of multi-view video data, the apparatus comprising:
- a receiver which is configured to receive a bitstream obtained by encoding a multi-view color video frame and a depth map frame corresponding to the multi-view color video frame;
- a color video frame decoder which is configured to decode the encoded multi-view color video frame obtained from the bitstream;
- a splitter which is configured to split a block of the decoded multi-view color video frame into at least one partition based on a pixel value of the block of the decoded multi-view color video frame;
- a correlation parameter obtainer which is configured to obtain a parameter indicating a correlation between each of block partitions of the multi-view color video frame and each of block partitions of the depth map frame by using peripheral pixel values of the block partitions of the multi-view color video frame and peripheral pixel values of the block partitions of the depth map frame corresponding to the block partitions of the multi-view color video frame with respect to each of the block partitions of the decoded multi-view color video frame; and
- a depth map decoder which is configured to obtain prediction values of the corresponding block partitions of the depth map frame from the block partitions of the decoded multi-view color video frame by using the obtained parameter.

* * * * *